Dec. 4, 1956 I. V. COLEMAN 2,773,127

CALLING LINE IDENTIFICATION APPARATUS

Filed Feb. 11, 1955 9 Sheets-Sheet 1

INVENTOR.
Ivan V. Coleman
BY
Smith, Olsen, Baird & Gulbrandsen
Attys.

Dec. 4, 1956 I. V. COLEMAN 2,773,127

CALLING LINE IDENTIFICATION APPARATUS

Filed Feb. 11, 1955 9 Sheets-Sheet 2

INVENTOR.
Ivan V. Coleman
BY
Smith, Olsen, Baird & Gulbrandsen
Attys.

CALL RECORDER 2000

INVENTOR.
Ivan V. Coleman
BY
Smith, Olsen, Baird & Gulbrandsen
Attys.

Dec. 4, 1956 I. V. COLEMAN 2,773,127

CALLING LINE IDENTIFICATION APPARATUS

Filed Feb. 11, 1955 9 Sheets-Sheet 4

INVENTOR.
Ivan V. Coleman
BY
Smith, Olsen, Baird & Gulbrandsen
Attys.

Dec. 4, 1956 I. V. COLEMAN 2,773,127

CALLING LINE IDENTIFICATION APPARATUS

Filed Feb. 11, 1955 9 Sheets-Sheet 5

INVENTOR.
Ivan V. Coleman
BY
Smith, Olsen, Baird & Gulbrandsen
Attys.

Dec. 4, 1956 I. V. COLEMAN 2,773,127

CALLING LINE IDENTIFICATION APPARATUS

Filed Feb. 11, 1955 9 Sheets-Sheet 6

INVENTOR.
Ivan V. Coleman

BY

Smith, Olsen, Baird & Gulbrandsen.
Attys.

Dec. 4, 1956 I. V. COLEMAN 2,773,127

CALLING LINE IDENTIFICATION APPARATUS

Filed Feb. 11, 1955 9 Sheets-Sheet 7

INVENTOR.
Ivan V. Coleman
BY
Smith, Olsen, Baird & Gulbrandsen
Attys.

Dec. 4, 1956 I. V. COLEMAN 2,773,127

CALLING LINE IDENTIFICATION APPARATUS

Filed Feb. 11, 1955 9 Sheets-Sheet 8

Inventor
Ivan V. Coleman
By
Smith, Olsen, Baird & Gulbrandsen
Attys.

INVENTOR.
Ivan V. Coleman
BY
Smith, Olsen, Baird & Gulbrandsen
Att'ys

United States Patent Office 2,773,127

Patented Dec. 4, 1956

2,773,127

CALLING LINE IDENTIFICATION APPARATUS

Ivan V. Coleman, Naperville, Ill., assignor to Automatic Electric Laboratories, Inc., Chicago, Ill., a corporation of Delaware Application February 11, 1955, Serial No. 487,572

24 Claims. (Cl. 179—18)

Figure 1:
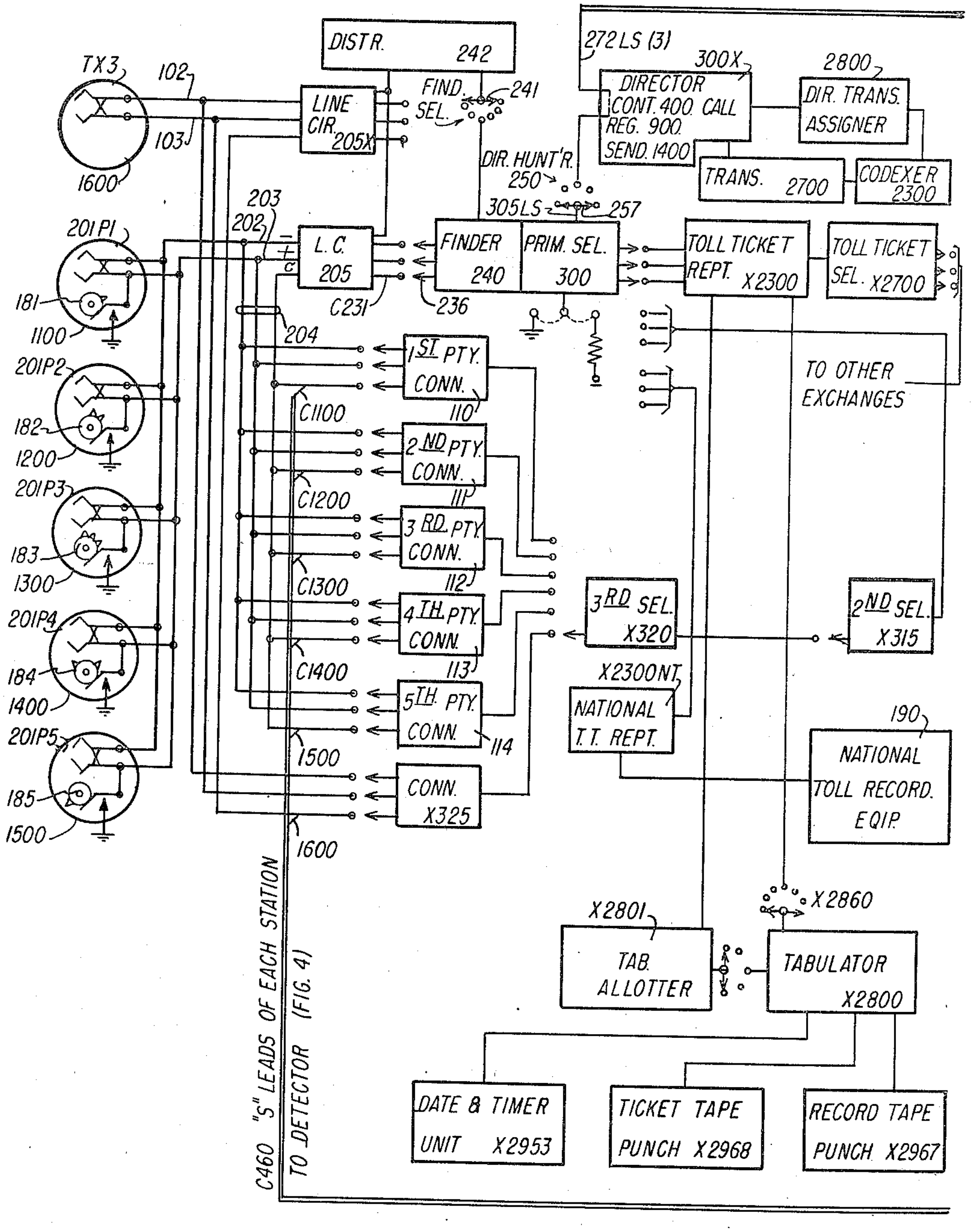

The present invention relates to improvements in telephone systems and more particularly to those systems in which identifying or detecting apparatus is required to determine the directory number of the calling station. More specifically, the present invention relates to detecting apparatus adapted to be incorporated in an automatic toll ticketing telephone system of the character disclosed in the copending Coleman application Serial No. 487,500 filed November 11, 1955, or of the type disclosed in the Ostline Patent No. 2,678,353, granted May 11, 1954. Each of the above mentioned systems may also employ detecting or identifying apparatus of the type disclosed in the Ostline Patent No. 2,639,330, granted May 19, 1953.

While the detecting apparatus disclosed in the Ostline Patent No. 2,639,330 is entirely satisfactory in operation, it is somewhat limited in that the different classes of subscriber stations must be included in groups with corresponding classes of stations and stations on individual lines cannot be grouped with different stations on party lines. Also, the line detecting apparatus fails to include the flexibility that is essential in large telephone exchanges.

Accordingly, it is an object of the present invention to provide in an automatic toll ticketing telephone system improved line identification or detecting apparatus that is directly operated to substantially instantaneously identify the digits in the numerical portion, as well as one or more of the digits of the calling exchange code of a calling station directory number and to register the information in the associated register sender or director of the system.

It is still another object of the invention to provide calling line identification apparatus having excess equipment that is arranged to identify as many as 50,000 terminals of different subscriber stations terminating in the exchange.

It is also an object of the present invention to provide certain parts of the detection apparatus in duplicate so that it may be selectively placed in service by means of a new and improved detector assigner circuit.

It is still another object of the invention to provide a new and improved all-relay type detector assigner circuit for automatically, and substantially instantaneously, connecting the calling line identification or detecting apparatus with the particular calling register sender for the exclusive use thereof.

It is still another object of the invention to provide duplicate sets of detector assigner equipment and automatic means for selecting the assigners and for removing either one of the assigners from service in the event it becomes inoperative or fails to connect up the identification apparatus or detector within a predetermined period.

It is still another object of the present invention to arrange the all-relay assigners so that they may be selectively operated in accordance with arbitrary digits assigned to identify each register sender or director. In the present system, each relay assigner is arranged to individually associate two-hundred register senders or directors with the calling line identification apparatus one at a time.

It is another object of the present invention to provide facilities in each of the detector assigners for locking-in a plurality of register senders or directors that have calling conditions thereon and for individually connecting each of the locked-in register senders to the detector one at a time so that only one register sender has exclusive use of the detector or calling line identification apparatus while the number of the calling line is being identified.

Further objects and features of the invention pertain to the particular arrangement of the circuit elements of the system whereby the above outline and additional operating features are attended.

The invention both as to its organization and method of operation, together with further objects and advantages thereof, will best be understood with reference to the following specification taken in connection with the accompanying drawings in which Figs. 1 to 9, inclusive, illustrate the apparatus incorporating an exchange of a telephone system provided with automatic toll ticketing facilities, which apparatus has incorporated therein the objects and features of the invention as briefly outlined above.

Figs. 1 to 9, inclusive, may be combined to form a unified system by placing the figures side-by-side in a straight line.

*The general arrangement of the telephone system*

In the above mentioned Coleman application and Ostline Patent No. 2,678,353, as well as in the present system, the automatic toll telephone ticketing system serves a large metropolitan area and adjacent suburban areas which are divided into a number of zones, each of which includes one or more exchanges. The telephone system of the present disclosure is also part of a national toll telephone system serving an extremely large geographical territory which is divided into a plurality of national toll areas each of which is identified by a three digit national toll code. Each national toll area includes a plurality of telephone exchanges, each identified by a different three-digit office code. Each exchange terminates subscriber lines connected to subscriber stations that are identified by four numerical digits consequently, any subscriber station in any exchange in any national toll area may be identified by the usual director number comprising a three digit exchange code and the four numerical digits preceded by the three digit national toll code. If the called station is located in an exchange in the same national toll area as the exchange of the calling station then the national toll code is not required.

Referring now to Fig. 1 of the drawing, it will be seen that the apparatus disclosed therein is schematically illustrated in block diagram form and it represents the exchange apparatus located, for example, in the Florida 3 exchange, as shown in detail in the previously mentioned Ostline Patent No. 2,678,353 and in the above mentioned copending Coleman application.

Figure 2:
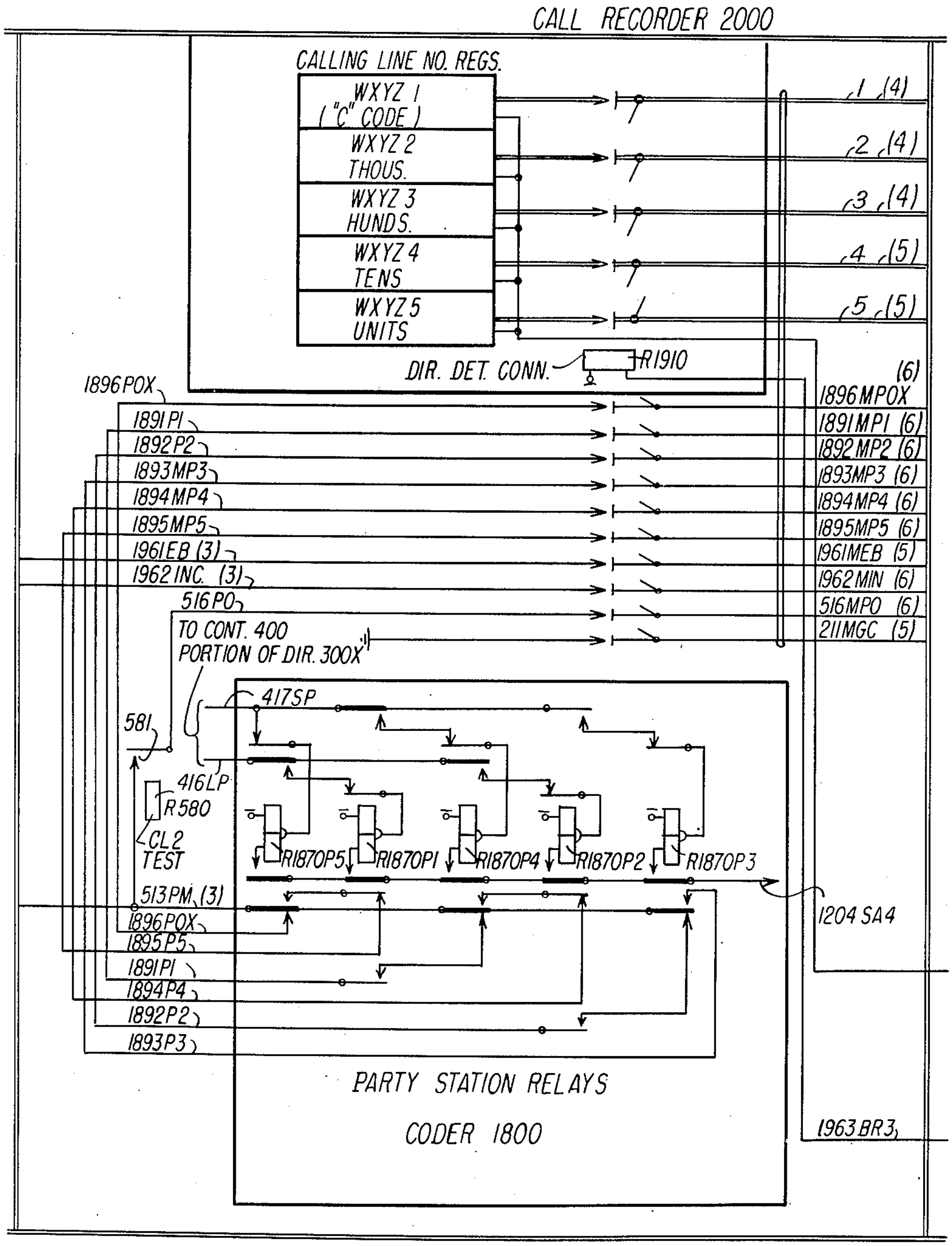
Figure 3:
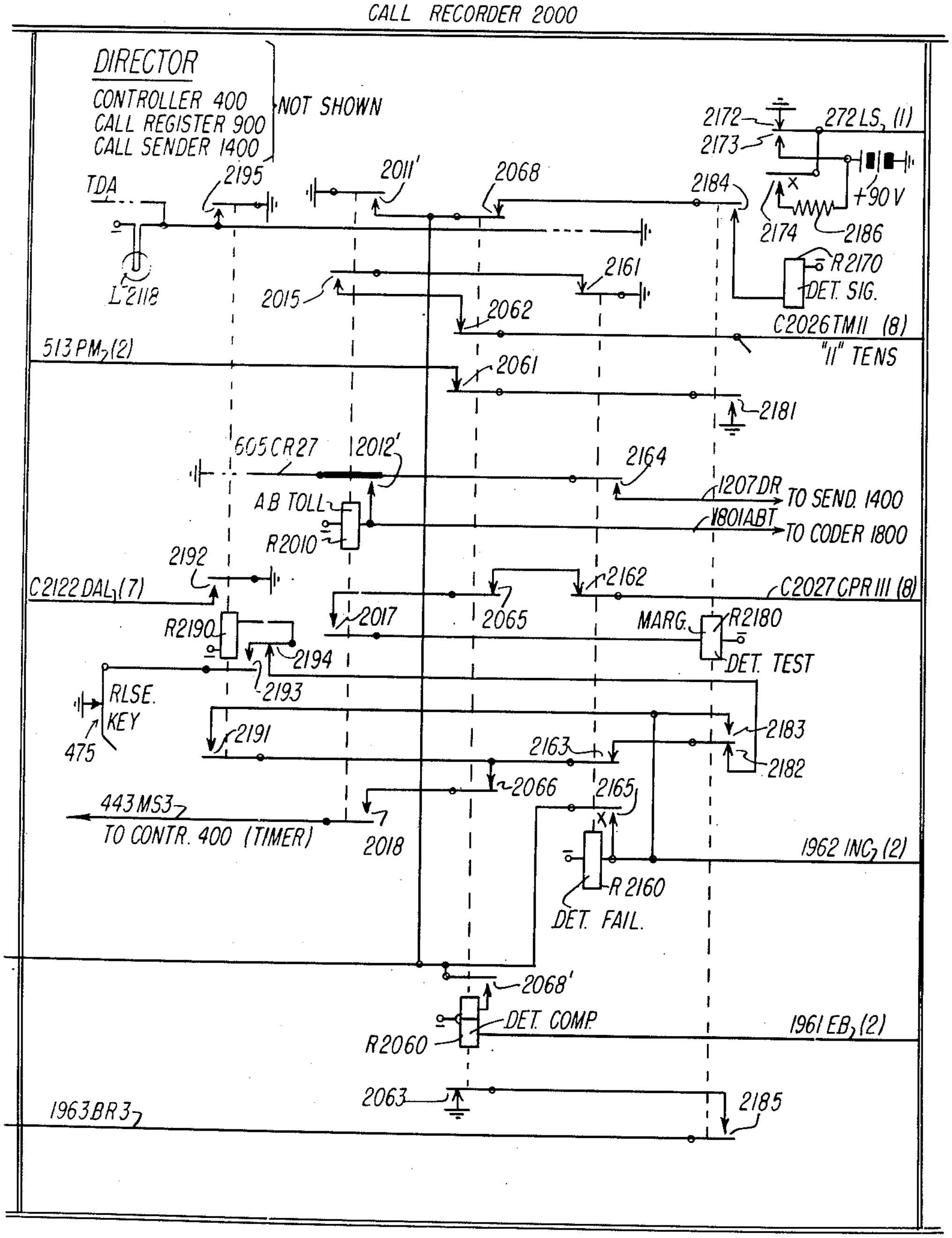

Figs. 2 and 3 illustrate, partially in schematic form, sufficient of the details of the call recorder 2000 portion of a director in the Florida 3 exchange to describe the operation thereof in connection with the control of the detector assigner 1910A and the detector 1900 of the system. The designations of the apparatus of the call recorder 2000 portion of the director schematically illustrated in Figs. 2 and 3 are the same as the designations on the corresponding apparatus disclosed in the Coleman application. Reference may be had to disclosure of the last-mentioned application for a description of the detailed operation of the call recorder 2000 portion of the director, as well as all of the other equipment forming a part of the present system.

Figure 4:
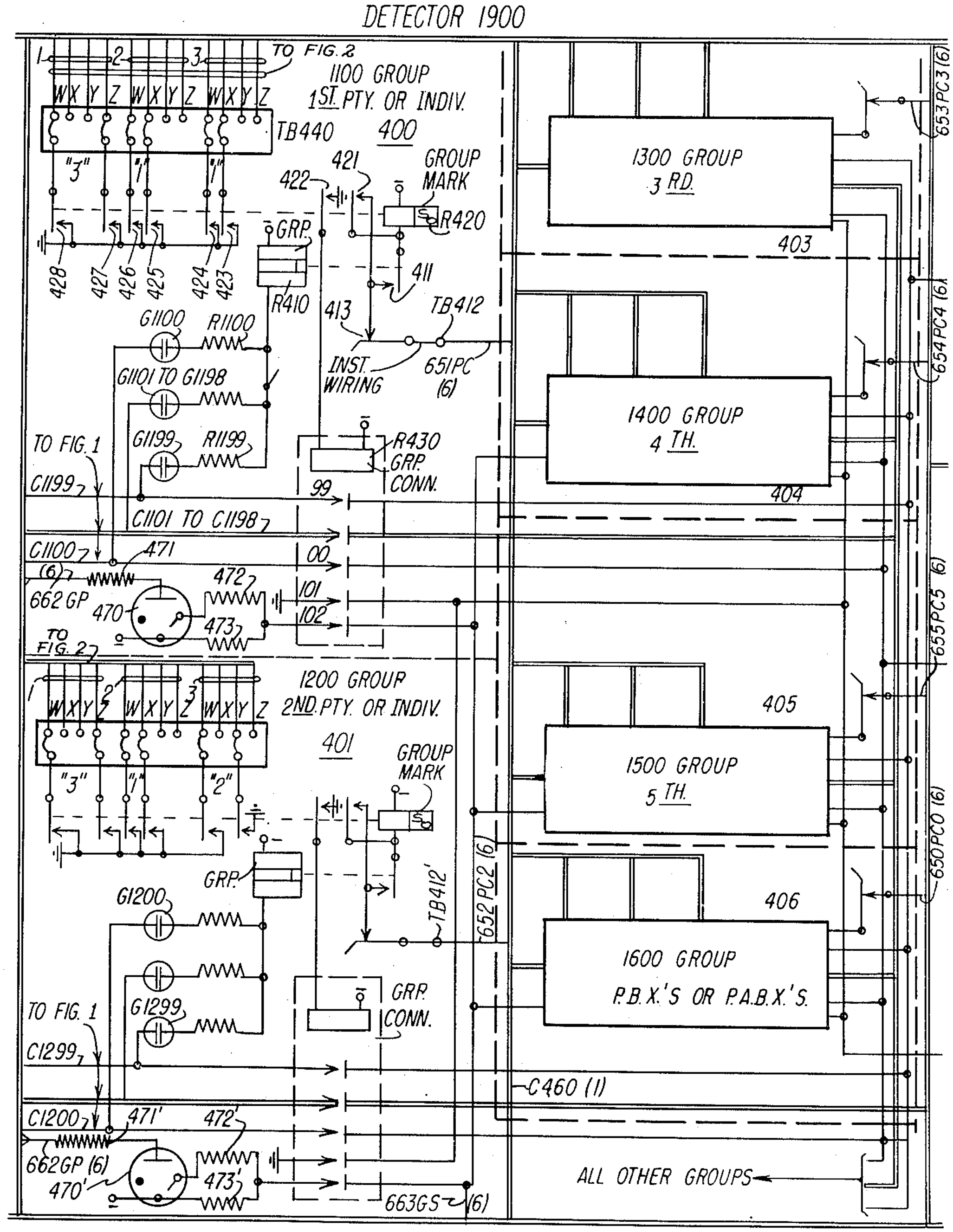
Figure 5:
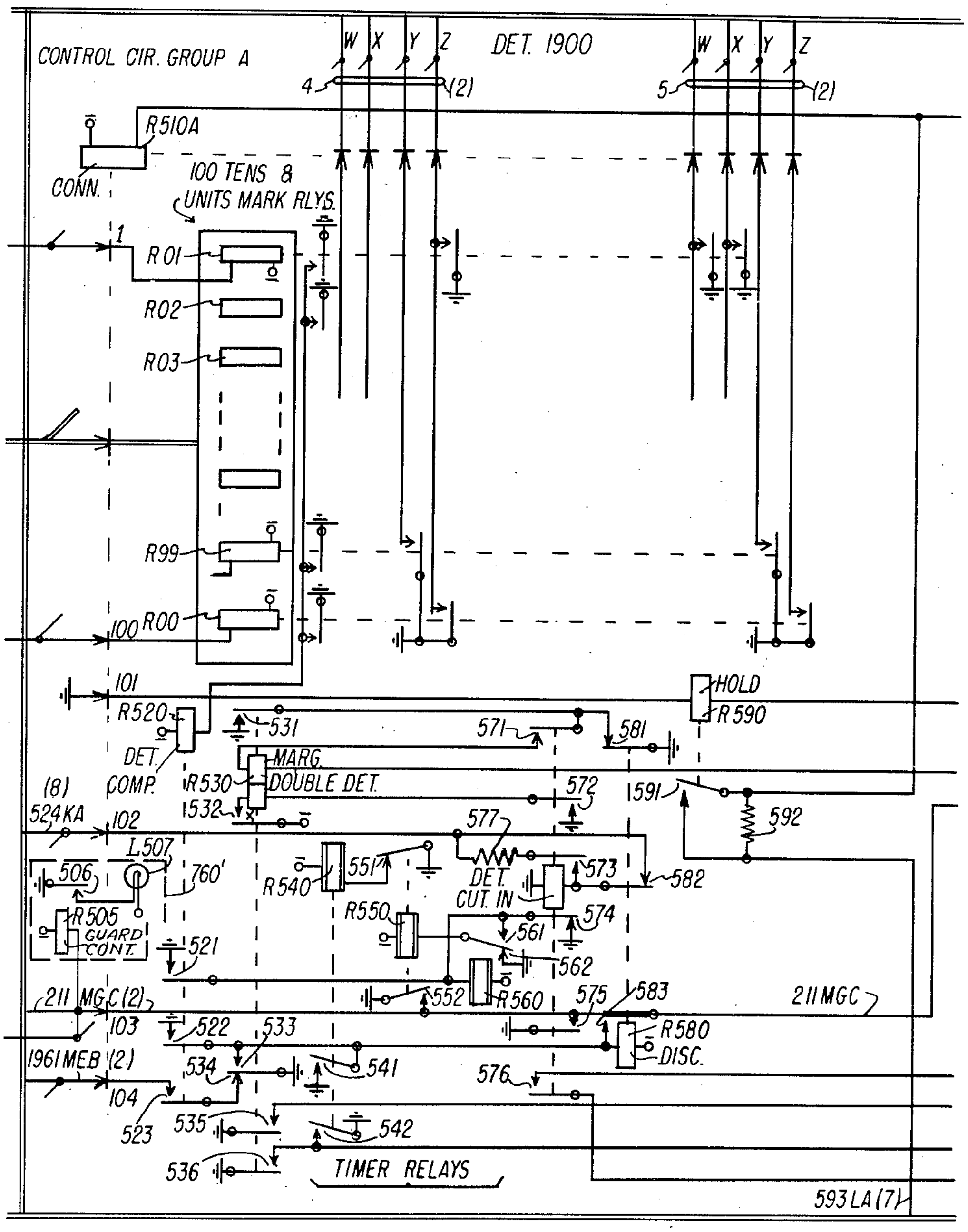
Figure 6:
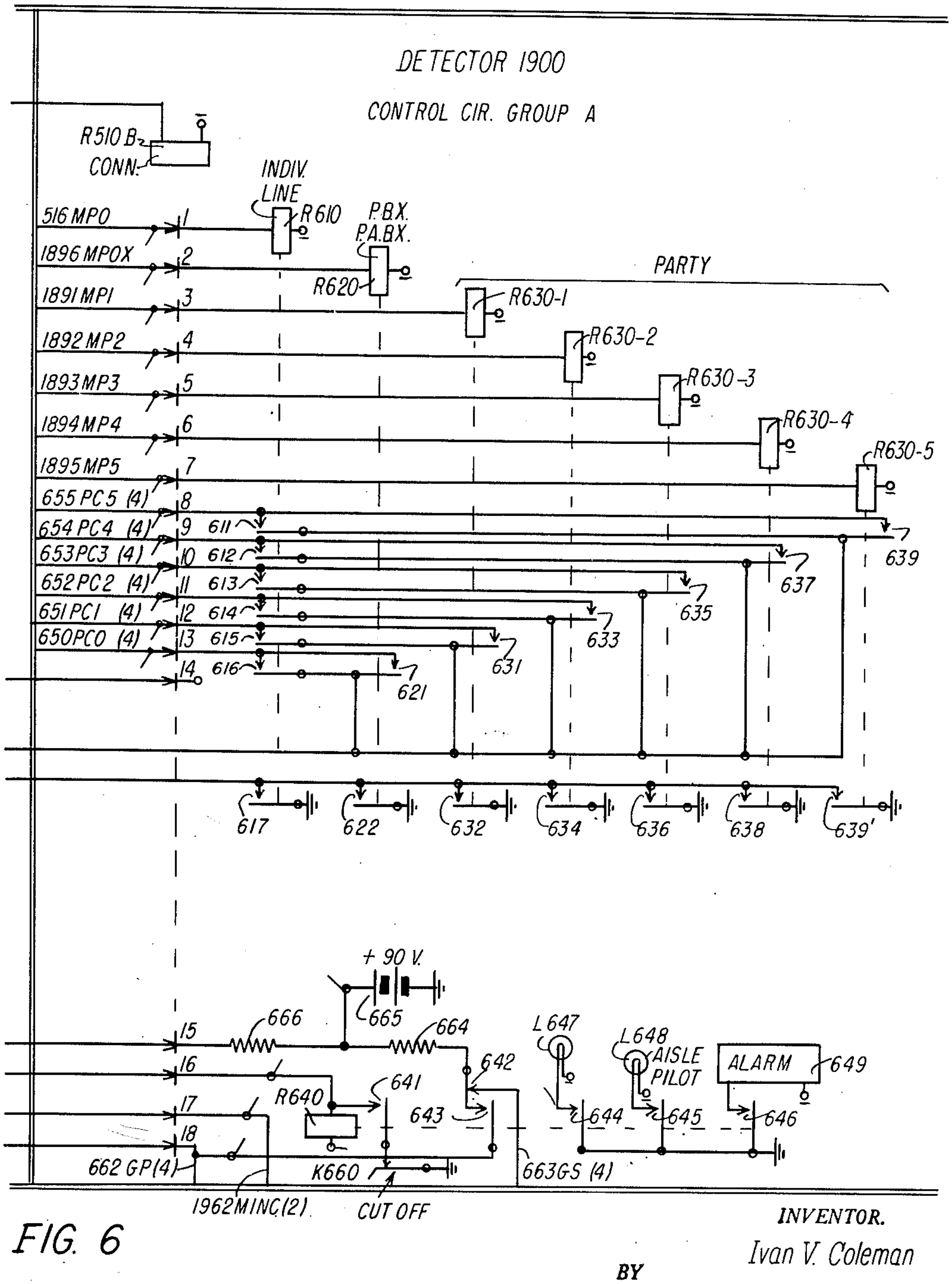

Figs. 4, 5 and 6 disclosed sufficient of the details of the detector 1900 to clearly describe the same. In this connection, it should be noted, the access portion of the detector illustrated in Fig. 4 terminates the C conductors individual to each of the subscriber stations. These C conductors terminate in the bank contacts of the connectors in the exchange and are utilized by the detector to ascertain the last five digits of the seven digit directory number of a calling subscriber substation in the exchange. Since each station is installed on a terminal-per-station basis, as many terminals are provided in the connector banks as there are subscriber stations to be served by the system. The control circuit group A portion of the detector 1900 shown in Figs. 5 and 6 includes one hundred marking relays R00 to R99, inclusive, for identifying the corresponding tens and units digits of any calling station directory number in any hundred group. Also the control circuit group A includes individual relays R610 to R630-5, inclusive, which individually correspond to all individual lines, all P. A. B. X and P. B. X lines, and all of the first, second, third, fourth and fifth stations on five-party lines. The last-mentioned relays are individually operated in order to control the access portion of the detector 1900 (Fig. 4) to limit the operation thereof to identification of numbers of the corresponding types of stations.

Figure 7:
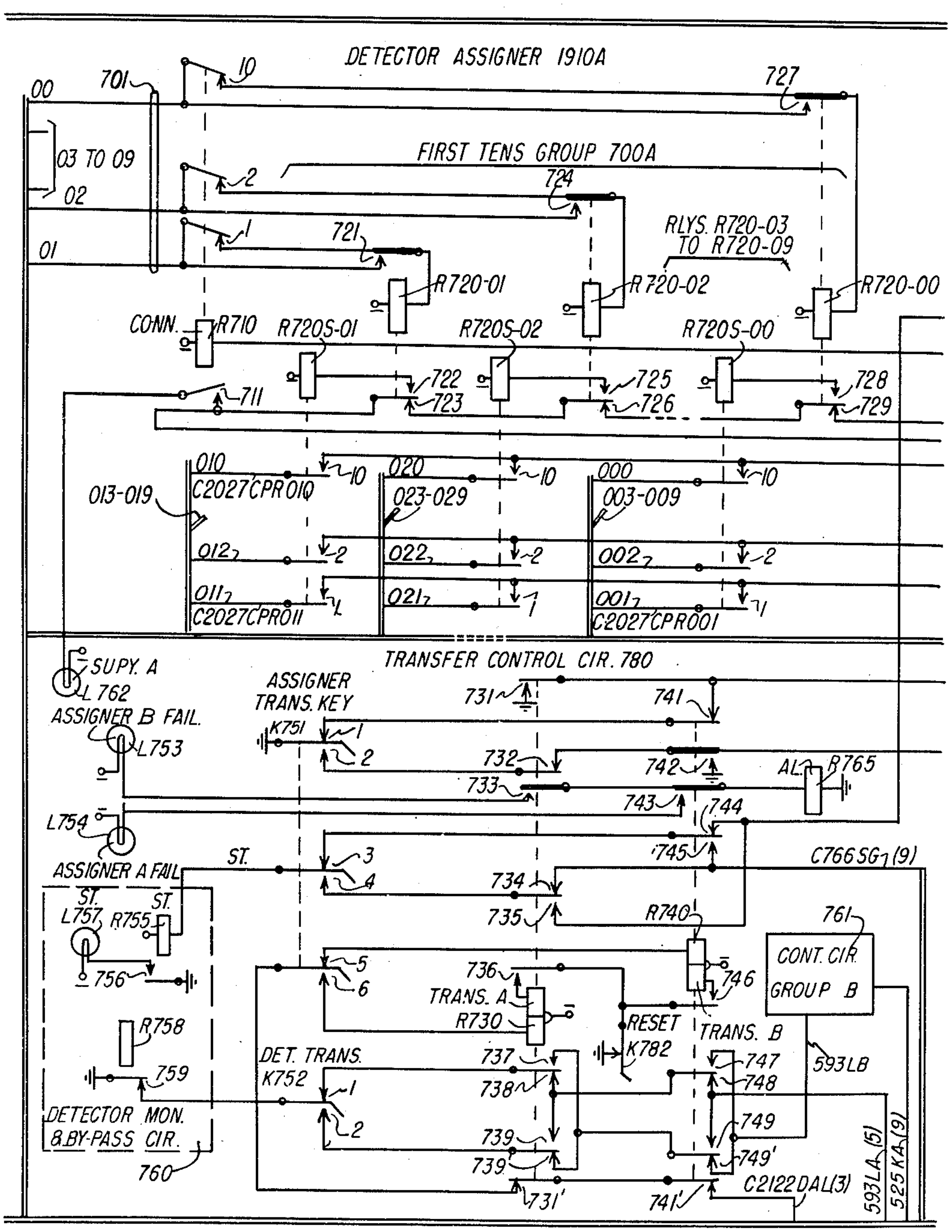
Figure 8:
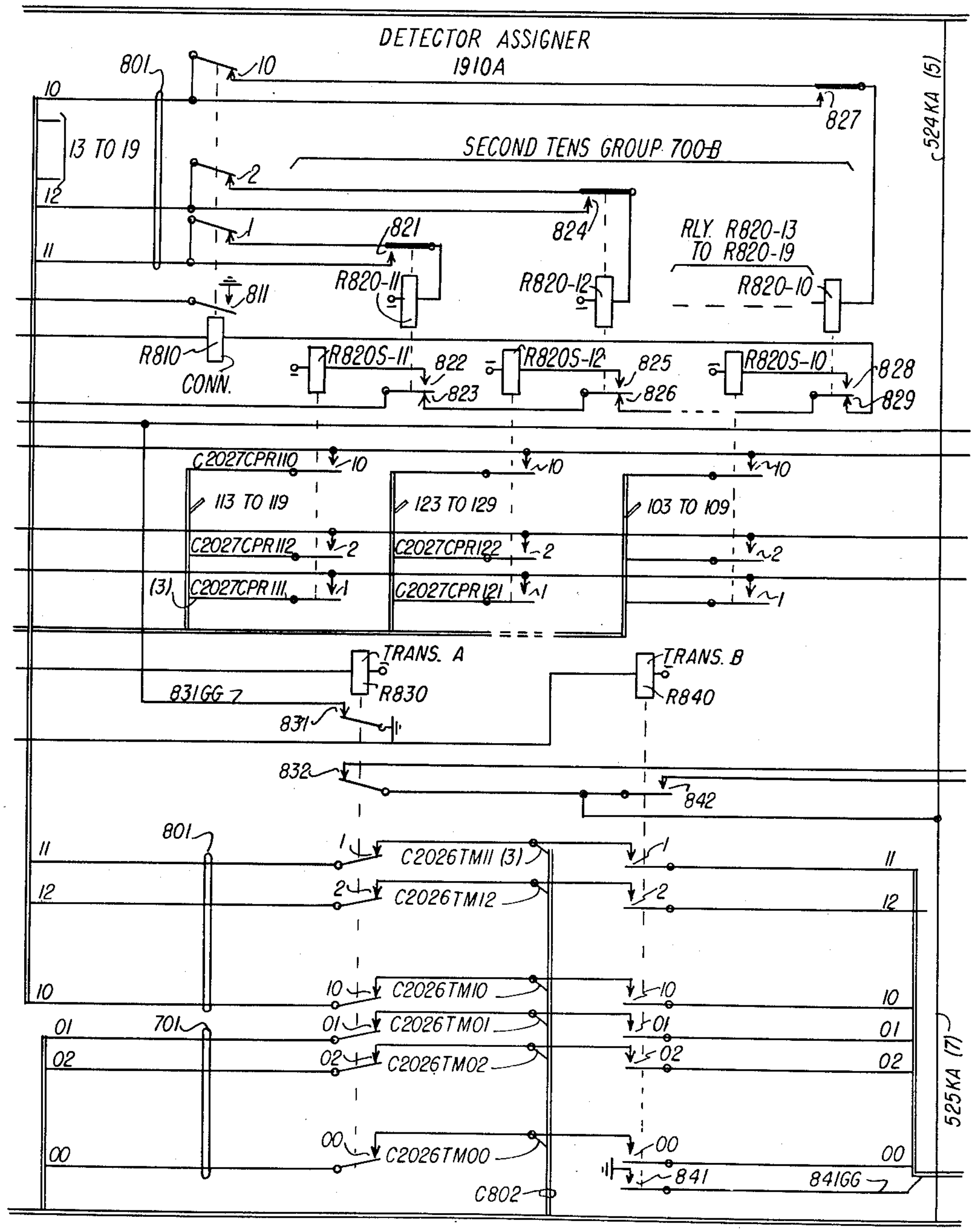
Figure 9:
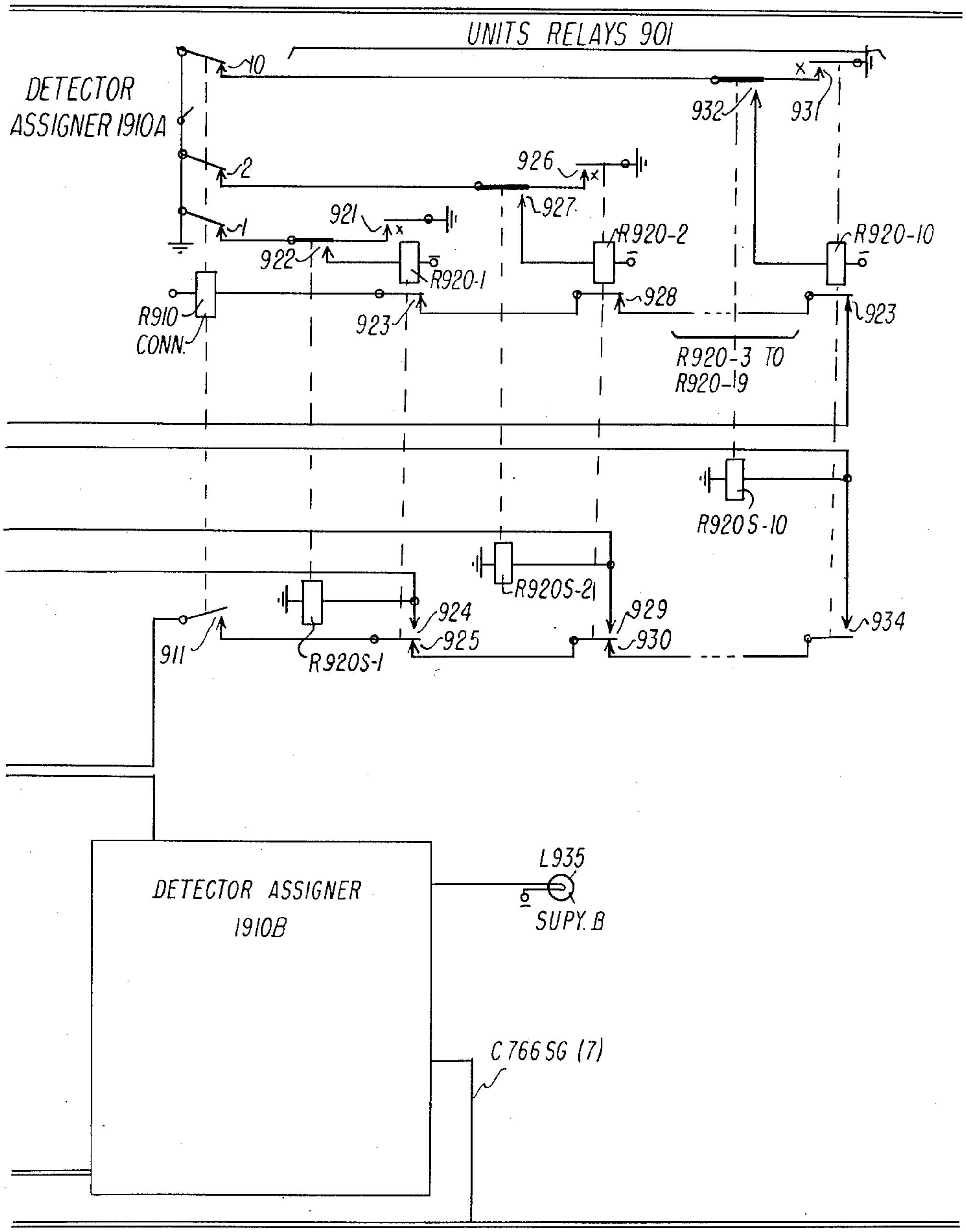

Figs. 7, 8 and 9 taken together, disclose the detector assigner 1910A which is arranged to connect any calling one of two hundred register senders or directors to the detector 1900. For this purpose, the first tens group 700A shown in Fig. 7 includes facilities for connecting the individual crosspoint return conductors of 100 register senders to the units relays 901 in Fig. 1 in groups of ten conductors. The second tens group 700B is substantially the same as the first tens group 700A and is arranged to connect the individual crosspoint return conductors of 100 additional register senders or directors to the units relay 901 of Fig. 9 groups of ten conductors. Also, in Figs. 7 and 8 the transfer control circuit 780 is provided for transferring the control of the assignment of the detector 1900 for use by any calling register sender, from the detector assigner 1910A to the detector assigner 1910B schematically illustrated in block diagram form in Fig. 9.

*The apparatus incorporated in the system*

Preferably, the telephone switching apparatus provided in the present exchange is substantially identical to that shown in the previously mentioned Coleman application and includes automatic switching equipment capable of serving as many as 50,000 terminals terminating a corresponding number of subscriber substations. The regular individual subscriber substation has been indicated by the reference TX3 but it should be understood that this designation also represents stations corresponding to lines extended from a P. B. X (private branch exchange) or from a P. A. B. X (private automatic branch exchange). Individual lines, as well as P. A. B. X and P. B. X lines, are provided with subscriber substations having conventional dials or calling devices arranged to interrupt the circuit including the line conductors to transmit impulses corresponding to the various digits dialed by the calling subscriber.

The terminals of the subscriber line including the conductors 102 and 103 are accessible from the connector X325. The five terminals in the exchange terminating the party line conductors 202 and 203 are accessible respectively to the groups of first, second, third, fourth and fifth party connectors 110 to 114, inclusive. Also, the party subscriber substations 201P1 to 201P5, inclusive, are respectively connected to the line conductors 202 and 203.

All subscriber lines in the exchange, such as the subscriber lines comprising the conductors 102—103 and 202—203 terminate in individual line circuits. For example, the line circuit 205X terminates the line conductors 102—103 of the station representative of the individual P. A. B. X and P. B. X lines. The line circuit 205 terminates the line conductors 202—203 commonly connected to the five-party subscriber substations 201P1 to 201P5, inclusive. At this point, it is noted that the individual stations, the P. B. X stations and the P. A. B. X stations, such as TX3, and all of the party subscriber stations are rendered free automatic local telephone service and automatic toll ticketing service to all exchanges in the metropolitan area and in the national toll areas for which charges are automatically established for the telephone connections.

Before proceeding further with the description of the operation of the apparatus included in the instant exchange, it should be noted that certain of the apparatus illustrated is provided with designations having the prefix or suffix "X." Such designations identify equipment corresponding to equipment having the same designations shown in the above mentioned Coleman application and also to certain of the apparatus disclosed and described in the previously mentioned Ostline Patent No. 2,678,353.

The equipment provided in the instant exchange also includes the finder 240 which has access to the line circuits 205 and 205X, under control of the common distributor 242 and the finder selecting switch 241. Each finder switch, such as 240, provided in the exchange is automatically selected for use, in response to a call on any one of the subscriber lines, under control of the associated distributor and finder selector. Also, each of the finders, such as 240, is individually associated with a primary selector, such as 300, and constitutes a part of the switch train over which connections are normally established to local subscriber substations and also to toll apparatus for recording purposes. Although Fig. 1 shows the finder 240 having access to the line circuit 205 of party subscriber line and to the line circuit 205X of P. A. B. X, P. B. X and individual lines, it is generally preferable to have the P. B. X and P. A. B. X lines terminate in line circuits that are accessible to finders, such as 240, in another group that do not have access to any other classes of lines. Each of the primary selectors, such as 300, is provided with a director hunter 250 having access to a group of directors including the director 300X. In some exchanges, it is necessary to provide as many as 200 directors in order to satisfactorily handle the telephone traffic during peak busy periods.

The director 300X schematically illustrated in Fig. 1 includes a controller 400 portion, a call register 900 portion and a sender 1400 portion, schematically represented by a block diagram. It should be noted, however, the director 300X also includes a call recorder 2000 portion and a coder 1800 portion which have been schematically illustrated in Figs. 2 and 3 of the drawings. In establishing telephone connections, the director 300X will register the digits of the directory number dialed by a calling subscriber, including the called exchange code of three digits and the four digits of the numerical portion of the directory number. When the call is to a subscriber located in an exchange in another national toll area, the calling subscriber will prefix the directory number of the desired called subscriber with the three digit national toll code identifying the area including the called exchange. In any event, the registration of the first three digits of either a national toll code or the first three digits of a called exchange code will control the director translator assigner 2800 to automatically associate the codexer 2300 and the translator 2700 with the calling director 300X so that a translation of the registered code comprising a plurality of routing digits will be registered in a route register in the coder 1800 portion of the director. These routing digits will be employed by the sender 1400 portion of the director to route the call by way of the primary selector 300 in the appropriate direction and the sender will thereafter transmit whatever digits have been registered by the calling subscriber that are necessary to complete the connection to the called subscriber substation. The translator 2700, however, is only called into use when the director 300X has ascertained that a translation is required and is released and made available to other directors in the exchange as soon as the translator has registered the routing digits in the associated director. The translator also functions with the director with which it is associated to indicate to the call recorder 2000 portion of the director that the particular call for which the translation was required is a toll call that is to be recorded and, consequently, requires the use of the detector 1900 to ascertain the directory number of the particular calling station involved in the telephone connection.

The exchange of the present system is also provided with local switching apparatus including, for example, the second selector X315, the third selector X320 and groups of connectors respectively including the connector X325, the first party connector 110, the second party connector 111, the third party connector 112, the fourth party connector 113 and the fifth party connector 114. While it has been previously stated that the individual connector X325 has access to the individual lines as well as the P. A. B. X and P. B. X lines of the exchange, it should be appreciated that all of the party connectors 110 to 114 in addition to having access to the party subscriber substations also have access to individual lines terminating in the associated contact banks. As illustrated, the five-party lines are multiply connected to the bank contacts of all the party connectors 110 to 114, inclusive, so that a connector in each group has access to the party line terminating in its associated contact bank. Each party station is accordingly terminated on a terminal per-station basis in the connector banks. The five connector groups represented by the designations 110 to 114, inclusive, respectively are provided with a different one of the five ringing frequencies assigned to signal the party stations 201P1 to 201P5, inclusive. However, single party lines for individual stations may be distributed throughout the different connector groups serving the party lines and the ringers at such individual stations must be tuned to respond to the frequency of the connector group in which the individual line terminates. Thus, the five-party connectors are each arranged to transmit ringing currents of a different frequency over a connected party line so that the tuned ringer at the called subscriber stations will be selectively operated by the corresponding ringing current transmitted thereto when the associated connector has been operated to select the corresponding subscriber line.

The various connectors and selectors of the present telephone system are of conventional construction and arrangement and may be, for example, of the type illustrated in Fig. 48 of "Telephone Theory and Practice-Automatic Switching and Auxiliary Equipment" by Kempster B. Miller, published by McGraw-Hill Book Co., Inc., of New York in 1933.

In addition to the foregoing, the present exchange is provided with toll ticketing apparatus comprising a number of groups of toll ticket repeaters, such as X2300 having associated toll ticket selectors, such as X2700, in order to establish connections to other exchanges. Also, the ticket repeaters, such as X2300, may be associated by means of a tabulator allotter X2801 to a tabulator X2800 through the ticket repeater finder X2860. The tabulator X2800 in turn may be associated with the dater and timer unit X2953, a ticket tape punch X2968 and a record tape punch X2967 in order to produce a perforated record of all of the items of information pertaining to each toll call established through a toll ticket repeater. In the case of national toll calls, however, the primary selector 300 instead of connecting with a toll ticket repeater, such as X2300, will instead connect with a toll ticket repeater included in a separate group provided for the sole purpose of handling national toll calls. This is illustrated in the present disclosure by means of the national toll ticket repeater X2300NT and its associated national toll recording equipment designated 190. The national toll recording equipment is substantially the same as the recording apparatus utilized in producing records of regular metropolitan toll calls extended through the toll ticket repeater X2300.

The call recorder 2000 portion of the director 300X, as schematically illustrated in Figs. 2 and 3, shows sufficient of the apparatus therein to describe the operation thereof in conjunction with the operation of the detector 1900 shown in Figs. 4 to 6, inclusive and the detector assigner 1910A shown in Figs. 7 to 9, inclusive. The manner in which the detector 1900, the detector assigner 1910A and the schematically illustrated call recorder 2000 cooperate will be described in detail hereinafter.

Considering the detector 1900 illustrated in Figs. 4 to 6, inclusive, it should be noted that it is permanently connected by identifying conductors in the cable C460 to each of the connector bank terminals of each of the subscriber stations in the exchange and it is associated with the call recorder 2000 portion of any calling director by means of the detector assigner 1910A shown in Figs. 7 to 9, inclusive. In the present system, as many as 200 different directors, may be individually associated with the common detector 1900 by means of the apparatus provided in the detector assigner 1910A.

Each subscriber station is provided with the usual substation apparatus including a telephone instrument, a ringer and a calling device or dial. The calling devices disposed at the regular individual subscriber substation, such as the substation TX3, and at the substations representative of P. A. B. X and P. B. X stations (not shown) are of conventional construction and arrangement and include the usual impulsing springs for transmitting impulses representative of the values of the digits in the called subscriber directory numbers. The calling devices disposed at the different stations on the five-party line, including the stations 201P1 to 201P5, inclusive, are of special construction and arrangement and may be of the type disclosed in the John E. Ostline Patent No. 2,410,520, granted November 5, 1946. Each of the special dials, in addition to the usual set of impulsing springs for transmitting impulses representative of different digits of directory numbers, is also provided with a set of cam springs which is utilized to identify the position of the particular calling subscriber station on the associated party line. In the present system, the cam 181 at the first party subscriber station 201P1 is arranged so that it will transmit a single ground pulse during the return movement of the dial; the cam 182 at the second station 201P2 will transmit two spaced-apart ground pulses during the return movement of the dial; the cam 183 at the third station 201P3 will transmit three spaced-apart ground pulses during the return movement of the dial; the cam 184 at the fourth station 201P4 will transmit two ground impulses, one pulse in the first position and another pulse in the third position (corresponding to the first and last positions of the three ground impulses transmitted by the cam 183) during the return movement of the dial; and the cam 185 at the fifth station 201P5 will transmit a single ground impulse (in the same position as the third impulse transmitted by the cam 183 at substation 201P3) during the return movement of the dial. These pulses are transmitted to the director 300X during the setting-up of a telephone connection from the respective stations on the party line 202—203 and control the operation of the party station relays in the coder 1800 (Fig. 2) to register therein the position of the calling station on the calling party line.

The detector 1900 illustrated in Figs. 4 to 6, inclusive, is arranged so that it can have access to more than 100,000 different station terminals in the connector banks.

In Fig. 4, for example, the 1100 group access equipment, which is the access equipment for one hundred subscriber stations having the last four digits 1100 to 1199, inclusive, in the directory number, includes the group relay R410, the group marking relay R420 and the group connect relay R430. Also, the 1100 group of access equipment includes 100 gas filled discharge tubes G1100 to G1199, inclusive, and associated resistors R1100 to R1199, inclusive. The gas filled discharge tubes are arranged with one terminal thereof so that they are respectively connected to the identifying conductors C1100 to C1199, inclusive, in the cable C460. Each conductor is individual to the connector bank terminal in the connector group having the corresponding terminal numbers. Thus, the 1100 group of gas filled discharge tubes G1100 to G1199, inclusive, are connected to the conductor C1100 to C1199, inclusive, in the cable terminating in the 1100 group of connector bank terminals. These terminals, of course, are also connected to the line circuits individual to the correspondingly numbered subscriber substations. The 1100 group relay B410 is arranged so that it will operate whenever one of the gas filled tubes G1100 to G1199 is rendered conductive and it will cause the operation of the associated group mark relay R420. The group mark relay R420 in turn is arranged to mark the terminal block TB440 in accordance with the third or "C" digit of the calling exchange code and in accordance with the thousands and hundreds digits 11 of the 1100 group. The operated group relay R420 is also arranged so that it will operate the associated group connect relay R430. The latter relay is of the multi-contact type and is provided with at least 100 make contacts 00 to 99, inclusive, corresponding respectively to the 100 conductors C1100 to C1199, inclusive, in the 1100 group. Additional contacts on this rely are also provided to control the associated signal tube 470. All the access equipment in the 1100 group has been given the designation number 400. The 1200 group of access equipment serving the subscriber stations have the last four digits 1200 to 1299, inclusive, in the directory number have been designated 401. The remaining groups 1300, 1400, 1500 and 1600 have been designated 403 to 406, inclusive. It will be appreciated, however, that as many access equipments like the 1100 group having the designation 400 may be provided as there are different hundred groups of subscriber substations to be identified by the detector 1900.

The 1100 group in the present disclosure has been arbitrarily indicated to be in the exchange "3" i. e., the third exchange identified as the FLorida exchange. It will be appreciated, however, that ten different exchanges identified as FLorida 1 to FLorida 0, inclusive, may be provided. Subscriber substations of the 1100 group in each of the ten exchanges would have the same numerical digits if they are in the 1100 group but the third or "C" digit of the calling exchange code would be different. As indicated in Fig. 4, the 1100 group of access equipment having the identification number 400 can serve first party subscriber stations on the party line as well as any individual lines having the last four digits of the directory number in the corresponding 1100 group of numbers. The 1200 group will serve the second party subscriber substations on the party line and may also include individual stations in the corresponding 1200 group of numbers. The 1300, 1400 and 1500 groups may also serve party subscriber substations corresponding respectively in the third, fourth and fifth stations on the party lines and may also include individual lines included in the same hundreds groups. The 1600 group having the designation 406 is representative of lines extending to P. B. X or P. A. B. X lines located in hotels, offices, factories, etc. All lines in serving P. A. B. X or P. B. X are provided in a separate group of line finder and primary selector links so that the lines in this group may be individually identified when calling as being in a different class from the groups of lines that include party lines and individual lines in the exchange.

The detector 1900 also includes the control circuit group A of Fig. 5 comprising 100 tens and units marking relays respectively designated R00 to R99 which are respectively connectable to the 100 contacts of each of the group connect relays, such as R430, in each of the hundreds groups included in the detector 1900. More specifically, the 100 tens and units marking relays R00 to R99 may be connected respectively to the correspondingly numbered contacts on any one of the group connect relays, such as relay R430, any hundred group of access equipment by operation of the corresponding group connect relay to determine the particular one of the 100 stations in the corresponding hundred group that is calling. The operated one of the marking relays R01 to R00, inclusive, through its associated contacts, will mark the WXYZ4 and WXYZ5 marking conductors extending to Fig. 2 in order to register the particular tens and units digits in the WXYZ4 and WXYZ5 calling line number registers in the call recorder 2000 portion of the calling register sender.

Furthermore, the detector 1900 includes in the control circuit group A, various relays designated R520 to R590, inclusive, for performing various controls in connection with the operation of the detector 1900. In Fig. 6, additional control relays included in the control circuit group A portion of the detector 1900 are provided in order to register the class of service of the particular calling subscriber substation or the position of the calling station on a calling party line.

Since the detector 1900 can only identify the directory numbers of calling subscriber substations one at a time, it is extremely important that the detector be associated with a calling register sender or director at the instant the information regarding the calling number is required by the director. It is also important that the director be immediately disconnected therefrom as soon as the number of the calling station has been determined by the detector and registered in the associated director. For this purpose, the present system is provided with the detector assigner 1910A illustrated in Figs. 7 to 9, inclusive. This assigner includes a first tens group 700A of relays R720-01 to R720-00 for connecting the group of 100 directors designated 000 to 099, inclusive, to the ten units relays 901. It also includes a second tens group 700B of relays R820-11 to R820-10, inclusive, for connecting the group of 100 directors designated 100 to 199, inclusive, to the ten units relays 901. By means of the first and second tens groups of relays 700A and 700B and the group of units relays 901, the detector assigner 1910A may be controlled by any calling director in accordance with its assigned three digit number (000 to 099 and 100 to 199) to connect the detector 1900 for the exclusive use of the particular calling director. If several calling directors simultaneously require the use of the detector, the detector assigner 1900A is arranged so that it will connect the detector to such calling directors one at a time. With this arrangement, groups of calling directors may be locked-in the assigner 1910A and all other directors will be locked-out until all locked-in directors have been connected to the detector one at a time and disconnected therefrom. In this connection, it may be well to mention at this time that the detector assigner 1910B schematically illustrated in Fig. 9 is provided so that it can be placed into service either automatically or manually whenever it is necessary to remove the detector assigner 1910A from service. The transfer control circuit 780 shown in Figs. 7 and 8 is provided for this purpose.

Referring again to the group marking relay R420 of the 1100 group, it will be seen that this relay will mark the WXYZ1, WXYZ2, and WXYZ3 marking conductors in accordance with the respective digits 311. These conductors extend to Fig. 2 where they terminate in the calling line number register so that the digit 3 marked on the WXYZ1 code marking conductors will be registered in the WXYZ1 "C" code register. The digit 1 will be registered in the WXYZ2 thousands digit register and the digit 1 will also be registered in the WXYZ3 hundreds digit register. These registers, as previously stated, are schematically illustrated in Fig. 2 of the call recorder 2000 portion of the director. The WXYZ4 and WXYZ5 marking conductors are respectively connected to the various contacts associated with the tens and units marking relays shown in Fig. 5 of the detector 1900. Consequently, these conductors will be marked in code form in accordance with the tens and units digits of the corresponding relay so that whenever the associated relay is operated, the conductors will be marked in accordance with the identifying tens and units digits. These conductors also terminate in the calling line number registers of the call recorder 2000 portion of the director as schematically illustrated in Fig. 2 and the WXYZ4 tens register and WXYZ5 units register will respectively register the tens and units digits corresponding to the operated one of the tens and units marking relays R00 to R99, inclusive. Only the contacts on the relays R00, R01 and R99 are shown but it will be understood that the contacts on the remaining 98 relays will be arranged to mark the code marking conductors WXYZ4 and WXYZ5 in accordance with the respective tens and units digits identifying the corresponding relay.

Each of the five registers WXYZ1 to WXYZ5, inclusive, of the call recorder 2000 portion of the director is provided with four relays (not shown) respectively designated W, X, Y and Z that are operated individually or in combinations to register any one of the digits 1 to 9 and 0 in accordance with the following code:

| Grounded WXYZ Marking Conductor | Operated WXYZ Relay Register | Digit Registered |
|---|---|---|
| WX | WX | 1 |
| WY | WY | 2 |
| WZ | WZ | 3 |
| XY | XY | 4 |
| XZ | XZ | 5 |
| YZ | YZ | 6 |
| W | W | 7 |
| X | X | 8 |
| Y | Y | 9 |
| Z | Z | 0 |

*General operation of the telephone system*

Considering now the general operation of the telephone system, it is noted that when a metropolitan toll call or a national toll call is extended from one of the subscriber stations in the illustrated exchange to a called subscriber station in another exchange for which a charge should be made for the call, the toll ticketing apparatus included in the illustrated exchange will produce a record containing various items of information pertaining to the call. The items of information contained on the record will necessarily include the calling station directory number comprising three digits indicative of the calling exchange code and four digits indicative of the calling station connector bank terminal number. In addition to the foregoing, the record will include the directory number of the called station if it is located in the same national toll zone as the calling exchange. If on the other hand, the call is to a station that is located in national toll area identified by a national toll code other than the one in which the calling exchange is located, then the national toll recording equipment 190 illustrated in Fig. 1 will be used and the record will then include a three digit national toll code identifying the national toll area in which the called exchange and station are located. Other items of record information may for example, include the time duration of the call, the class of service assigned to the calling station, the day and the month the call was established and perhaps the hour and minute that the call was completed. The records can be produced on perforated tapes by punch equipment and may be used at the end of any billing period to control commercial type billing or printing equipment which will print individual tickets or records corresponding to the various items of record information.

If it is assumed that a toll call is initiated by the calling subscriber at substation TX3 (Fig. 1) whose directory number is FLorida 3–1600 and the call is to be extended to a subscriber in another exchange, the removal of the receiver from the switch hook of the associated telephone instrument will complete a loop circuit over the line conductors 102–103 to operate the line circuit 205X. The line circuit 205X in turn will cause the distributor 242 and the finder selector 241 to cooperate in the well known manner to select an idle finder, such as 240, in a group of finders assigned to handle calls in the particular group including the calling subscriber line circuit. Thus, the line finder 240 will operate in a conventional manner to connect with the terminals of the calling subscriber line. At this time, the primary selector 300 individually associated with the finder 240 will cause the director hunter 250 to associate an idle director, such as 300X, with the subscriber line. A dial tone signal will thereupon be transmitted to the subscriber to indicate that the directory number of the called subscriber may now be dialed and to also indicate that the called subscriber directory number may be preceded by the national toll code if the called station is located in another national toll area. The code portion of either the called subscriber directory number or the national toll code, as dialed by the calling subscriber, is registered in the call register 900 portion of the director 300X and it will indicate that the translator 2700 and its codexer 2300 will be required to provide the necessary routing digits to extend the call to the desired called destination.

The registration of the third digit of the three digit called office code or the third digit of the national toll code will cause the director translator assigner 2800 to associate the codexer 2300 and translator 2700 with the calling director 300X. As a result of this connection, the translator 2700 will be selectively operated in accordance with the first three digits registered in the codexer 2300 by the director 300X and it will immediately register in the coder 1800 portion of the director the necessary routing digits that must be utilized by the director in setting-up the connection toward the called destination. The translator will also control the director to transmit whatever additional digits have been registered therein by the calling subscriber in order to complete the connection to the called station. Also, the translator will control the director 300X so that the call recorder 2000 portion thereof will be utilized to register the directory number of the calling station. After the foregoing controls by the translator 2700 have been exercised, it will be disconnected from the associated director and made available for use by other calling directors.

The director 300X now operates in the manner described in the above mentioned Coleman application and in the previously mentioned Ostline Patent No. 2,678,353 to transmit the routing digits registered therein to the primary selector 300. The selector will respond to the first digit received from the director 300X and will select an available trunk in a group of trunks extending, for example, to the toll ticket repeater X2300. If the call in question is preceded by a national toll code, the director will instead control the primary selector 300 in accordance with the first routing digit to select an idle trunk in a group of trunks extending to a national toll ticket repeater, such as X2300NT. The next routing digit transmitted by the repeater X2300 will control the ticket repeater X2700 individually associated with the ticket repeater X2300 to select an idle trunk extending in the direction of the desired called exchange. This is also true in the event that the national toll ticket repeater X2300NT is seized. Remaining digits are transmitted by the director 300X over the above traced path and repeated to switching apparatus in the next exchange or in the next switching center so that the call can be completed in a conventional manner to the desired called station or it can be completed through toll switching apparatus to other exchanges on a national toll basis. As pointed out above, the call recorder 2000 portion of a calling director is controlled by the translator 2700 in order to initiate operations whereby the detector 1900 will be brought into use to identify and register the number of the calling subscriber substation in the calling line number registers in the call recorder 2000.

During the time that the calling subscriber dials the digits of the called station directory number, the director 300X is also operated to register in the call recorder 2000, whether the calling station is on an individual line or is a party station on a party line. Referring now to Fig. 2, it will be seen that the party station relays are schematically illustrated in the coder 1800 portion of the director and are designated respectively R1870P1 and R1870P5. These relays are selectively operated depending upon the character of the calling station to mark the conductors 1891P1 to 1895P5 when any one of the corresponding stations 1 to 5 on the party line is making the call. The conductor 1896POX is marked whenever a P. A. B. X or a P. B. X station initiates the call and the conductor 516P0 will be marked whenever an individual station on an individual line initiates a call.

As previously noted, each of the party stations on the party line is provided with a special calling device having a cam that is effective during the return movement of the dial to transmit ground pulses over the line conductors to the connected director. During this same return movement of the dial the conventional impulsing springs are opened a number of times to transmit loop impulses corresponding in number to the value of the digit dialed. The operations whereby the loop impulses and station identifying ground impulses are transmitted to the director are described in detail in the previously mentioned copending Coleman application as well as in the Ostline Patents No. 2,639,330 and No. 2,678,353. In the director 300X, a line relay (not shown) is provided to respond to the loop impulses transmitted by the dial at the calling station and a party relay (not shown) is provided to respond to the ground impulses identifying the position of the calling station on the calling party line.

In Fig. 2 the control circuits for the party station relays R1870P1 to R1870P5 include the conductors 416LP and 417SP. The conductor 416LP is controlled by the line relay (not shown) in the director in accordance with the loop impulses and the conductor 416SP is controlled by the party relay (not shown) in the director in accordance with the station identifying ground impulses. It should be understood, however, that during the return movement of the dial the regular loop pulses will be transmitted to the line relay and the latter relay in turn will apply ground pulses to the conductor 416LP extending to the party station relays in Fig. 2. However, unless the relay R1870P5 or the relay R1870P4 is operated by a station identifying pulse the pulses on the conductor 416LP from the director line relay cannot control any of the party station relays.

If, for example, the cam 181 at the party station 201P1 transmits a ground pulse over the conductors 202 and 203 at a time when the associated loop impulsing contacts are closed, then the party relay (not shown) in the director will transmit a single ground pulse over the conductor 417SP to complete the operating circuit for the upper winding of the relay R1870P5. The relay R1870P5 operates when this circuit is completed and locked itself over a series circuit including its upper and lower windings to the locking conductor 1204SA4 which is grounded by the controller 400 portion of the director. The ground pulse for operating the relay R1870P5 is applied to the conductor 417SP just prior to the transmission of the next to the last loop impulse by the dial at substation 201P1. The next to the last loop impulse will control the line relay (not shown) in the director 300X to transmit a pulse over the conductor 416LP in order now to operate the relay R1870P1 over a circuit including its upper winding. The latter relay also locks itself over a series circuit including its upper and lower windings to the locking conductor 1204SA4. The last loop impulse transmitted during the return movement of the dial at the calling subscriber substation has no further effect on the calling subscriber relays because an additional ground pulse is not transmitted to the relay R1870P4. With the relays R1870P5 and R1870P1 in their operated positions, the subsequent application of ground potential to the conductor 513PM will complete a circuit by way of a break contact on the relay R1870P4 and a make contact on the operated relay R1870P1 to mark the conductor 1891P1 and thus indicate that the calling station is the first station on the calling party line.

The relays R1870P1 to R1870P5, inclusive, shown in Fig. 2, which form a part of the coder 1800 portion of the director shown in the copending Coleman application, are operated in a predetermined sequence by pulses transmitted over the conductor 416LP and 417SP under control of the different dials at the different stations on the party lines. The manner in which the party station relays R1870P1 to R1870P5, inclusive, are selectively operated by the different pulses to identify the different stations on a five-party line may best be understood by reference to the following chart:

| Pulses | First Ground | Next To Last Loop | Second Ground | Last Loop | Third Ground |
|---|---|---|---|---|---|
| Station: | | | | | |
| 1 | R1870P5 | R1870P1 | ------ | ------ | ------ |
| 2 | R1870P5 | R1870P1 | R1870P1 | R1870P2 | ------ |
| 3 | R1870P5 | R1870P1 | R1870P4 | R1870P2 | R1870P3 |
| 4 | R1870P5 | R1870P1 | ------ | ------ | R1870P4 |
| 5 | ------ | ------ | ------ | ------ | R1870P5 |

With the different party station relays R1870P1 to R1870P5 operated in the manner shown above, the different stations on a party line are identified by appropriate markings applied to the conductor 1891P1 to 1891P5, inclusive. It should be noted, however, that the conductor 1896P0X may be marked if all of the party stations R1870P1 to R1870P5 remain in their restored positions. Also, the conductor 516P0 will be marked in the event that the class 2 test relay R580 is operated to indicate that the calling subscriber station is on an individual line and is of the class 2 type. In the present system, as described in the previously mentioned Coleman application, the operation of the party station relays occurs during the dialing of the second digit by a calling subscriber. However, since the station identifying ground pulses are transmitted by the calling devices during each operation thereof to transmit impulses of a digit, it will be appreciated that the station identifying ground pulses could be registered during the dialing of any one of the digits of a plural digit number.

*Detailed operation of the detector assigner 1910A*

The initiation of a call by any one of the calling subscribers, for example, on a party line will control the line circuit 205 so that the distributor 242 in conjunction with its finder selector 241 will select an idle finder, such as 240, in the group of finders having access to the calling line. The finder 240 is individually associated with the primary selector 300 and is arranged so that its associated director hunter 250 will search for an idle director and connect the calling subscriber line to the available director. It may be assumed for the purpose of this description that the director 300X is selected by the director hunter 250 and that the calling station is one of the stations on the party line conductors 202—203. After the subscriber has dialed the necessary digits of the directory number of a called station (which also may be preceded by a three digit national toll code), the director will function in the manner described in the previously mentioned Coleman application and cause the association of the translator 2700 with the calling director so that the first three digits dialed by the calling subscriber will be translated into appropriate routing digits to route the connection to the desired destination. At this time, the translator 2700 will also determine whether or not the directory number of the calling station is to be ascertained by the detector 1900. This is accomplished by the translator 2700 in that it completes a circuit through the coder 1800 for operating the AB toll relay R2010 shown in Fig. 3 in the controller 2000 portion of the director. The relay R2010, at its contacts 2012′ locks itself to the grounded conductor 605CR29 so that it will remain in its operated position until the associated director is restored to normal. As a further result of the operation of relay R2010, it completes a circuit including its contacts 2015 for applying ground potential to the tens marking conductor C2026TM11 and at its contacts 2017 it simultaneously applies resistance battery through the winding of the marginal detector test relay R2180 to the cross-point return conductor C2027CPR111. These conductors extend to Fig. 8 of the detector assigner 1910A and initiate operations therein whereby the calling director 300X, including its call recorder 2000 portion, will be connected to the detector 1900 exclusively of all other directors in the exchange.

It should be noted at this time that each director in the exchange is given an arbitrary three digit number. In the present system, the detector assigner 1910A has facilities for selectively connecting any one of 200 different directors to the detector 1900. It will be understood from the following description of operation of the detector assigner 1910A that its capacity may be increased to include additional hundreds groups of directors if desired. It will be assumed that the director 300X is identified as director 111 for the purpose of this description. Consequently, the conductor C2026TM11 will be multiplied to nine other directors in the exchange having the three-digit identifying numbers 112 to 119 and 110. When any one of the ten directors is in a calling condition with the associated AB toll relay, such as R2010, operated, the conductor C2026TM11 will be grounded. The cross-point return conductors corresponding to the conductors C2026CPR111 in each of the directors is individual to the associated director. Therefore, the ten directors included in the group common to the conductor C2026TM11 will have the corresponding CPR conductors, such as C2027CPR111, designated C2027CPR112 to C2027CPR119 and C2027CPR110.

Referring now to Fig. 8, it will be seen that the tens marking conductor C2026TM11 extends by way of the closed contacts 1 on the operated transfer A relay R830, cable 801, contacts 1 on the operated connect relay R810, and the winding of the tens relay R820–11 in the second tens group 700B, to battery. Thus, when the conductor C2026TM11 is grounded by the operation of an AB toll relay, such as R2010, in the call recorder 2000 portion of a calling director, the relay R820–11 is operated. The same relay, of course, will be operated when one or more of the other nine directors in the same tens group has its associated AB toll relay in an operated condition.

It should also be noted that the detector assigner 1910A is effective at the present time, instead of the detector assigner 1910B, due to the fact that the transfer A relay R830 is in its operated position. This relay is included in a circuit from ground at contacts 1 on the assigner transfer key K751 and contacts 741 on the restored relay R740. It is apparent that the transfer B relay R840 instead of the transfer A relay R830 will be operated if the assigner transfer key K751 is actuated to close its contacts 2. This will disconnect the detector assigner 1910A and connect the detector assigner 1910B which is exactly the same as the illustrated detector assigner 1910A.

There are ten relays corresponding to the relay R820–11, three of which have been shown. Other relays, not shown, having the designations R820–13 to R820–19 are connected in the same manner as the three relays R820–11, R820–12 and R820–10.

As soon as the relay R820–11 operates, it locks itself by way of its contacts 821 to the grounded conductor C2026TM11. As a further result of the operation of relay R820–11, at its contacts 23, it opens a point in a chain circuit including the windings of the connect relays R710 and R810 so that these relays restore to normal. Thus, the relay R810 in restoring will interrupt, at its contacts 1, 2 and 10, and the remaining contacts 3 to 9, inclusive (not shown), the initial operating circuits for all of the relays R820–11 to R820–19 and R820–10. All of the unoperated relays in the second tens group 700B will be prevented from operating whereas the operated relay R820–11 will remain locked over a circuit that is independent of its initial operating circuit including the contacts 1 on the now restored relay R810. In Fig. 7, the corresponding connect relay R710 in restoring also opens, at its contacts 1 to 10, inclusive, the initial operating circuits for all of the tens relays, such as R720–01, in the first tens group 700A in order to prevent any of these relays from operating.

As a further result of the operation of relay R810, at its contacts 811, it completes a circuit including the contacts 744, contacts 3 on the assigner transfer key K751 and the winding of the relay R755, to battery, in the detector monitor and by-pass circuit 760. The latter relay, at its contacts 756, completes an obvious circuit for illuminating the start lamp L757 at the monitoring position to indicate that the detector assigner 1910A is in use to assign the detector 1900 to a calling director. As a further result of the restoration of the connect relay R710, at its contacts 711, it completes a circuit from the supervisory A lamp L762 to ground at contacts 871 on the operated transfer A relay R830. The illuminating condition of the supervisory A lamp L762 indicates that the detector assigner 1910A is in use.

Finally, at the contacts 822, the relay R820–11 connects its slave relay R820S–11 to a circuit including the break contacts, such as 723, on all of the restored relays, such as R720–01 in the first tens group 700A, and ground at contacts 831 on the operated transfer relay R830. The relay R820S–11 now operates to close its contacts 1 to 10, inclusive, in order to connect the ten individual cross-point return conductors C2027CPR110 to C2027CPR119 individual to the ten directors in the eleven tens group. Thus, at the contact 1 the conductor C2027CPR111 from the call recorder 2000 portion of the director 300X having the individual designation 111 is now connected to ground potential through the winding of the relay R920S–1 in the units relays 901 of Fig. 9.

The operating circuit for the units relay R920S–1 may be traced from ground, then by way of the winding of the relay, contacts 1 on the operated relay R820S–11 in the second tens group 700B, the cross point return conductor C2027CPR111 extending to Fig. 3, contacts 2162, 2065 and 2017 and the winding of the marginal detector test relay R2180, to battery. The relay R920S–1 operates in series with the relay R2180 but the resistance of the relay R920S–1 is too high to permit the detector test relay R2180 to operate at this time. As soon as the relay R920S–1 operates it completes, at its contacts 922, an obvious circuit for operating the relay R920–1. The relay R920–1 in turn, at its X contacts 921, completes a locking circuit for itself which includes the contact 922 on the operated relay R920S–1. As a further result of the operation of relay R920–1 it interrupts, at its contacts 923, the operating circuit for the connect relay R910. The relay R910 is normally energized over a circuit which includes battery, winding of the relay R910, contacts 923, 928, corresponding contacts on the relay R920–3 to R920–9, inclusive (not shown), contacts 933 to 831, to ground. Accordingly, if any one of the contacts included in the above mentioned circuit is open, the relay R910 restores to normal. At the contacts 1 to 10, inclusive, contacts 1, 2 and 10 being shown, the relay R910 interrupts points in circuits over which all of the units relays 901 may initially be operated. As a further result of the restoration of the relay R910, at its contacts 911, it now completes a multiple circuit for the marginal detector test relay R2180. This circuit, as previously described, may be traced from battery by way of the relay R2180, contacts 2017, 2065 and 2165, the cross-point return conductor C2027CPR111 extending to Fig. 8, contacts 1 on the operated relay R820S–11 and then over one branch circuit by way of the winding of relay R920S–1 to ground, and over another branch multiple circuit by way of contacts 924, 911 and 832, conductor 524KA extending to Fig. 5, contacts 102 on the operated multi-contact relay R510A, contacts 582 and the winding of the detector cut-in relay R570, to ground. At this particular instant, the grounded winding of the relay R920S–1 in the detector assigner 1910A and the grounded winding of the detector cut-in relay R570 in the control circuit group A of the detector 1900 are connected in multiple to a circuit including the winding of the marginal detector test relay R2180 in the call recorder 2000 portion of the calling director 300X. The relay R920S–1 remains in its operated condition and the detector cut-in relay R570 now operates. Since the resistance of the relays R920S–1 and R570 are now connected in multiple to the circuit of the marginal relay R2180, the current flow through the winding of the latter relay is now sufficient to permit the relay R2180 to operate. This will cause the call recorder 2000 portion of the director to be connected to the detector 1900 and the operation of the detector cut-in relay R570 will initiate operation of the latter equipment.

Referring now to the relay R2180 (Fig. 3) in the call recorder 2000 portion of the director, it will be seen that, at its contacts 2185, it completes a circuit including ground at contacts 2063, conductor 1963BR3 in order to operate the director detector connect relay R1910 (Fig. 2). The relay R1910 is of the multi-contact type and at its various contacts, it connects all of the conductors of the calling line number registered in the call recorder 2000, all of the conductors from the party station relays of the coder 1800 portion, and various other conductors in the director 300X whereby the director 300X is selectively connected to the detector 1900 exclusively of all other directors in the exchange.

As a further result of the operation of relay R2180 it disconnects, at its contacts 2182, a point in the operating circuit for relay R2190 so that the latter relay cannot be operated under control of the ground potential subsequently applied to the conductor 443MS3 by a timer (not shown) in the controller 400 portion of the director. However, at the contacts 2183, the relay R2180 prepares a point in the circuit for controlling the detector failure relay R2160 in the event that the detection cycle is not completed by the detector 1900 before the timer in the controller 400 of the director applies ground potential to the conductor 443MS3.

As a further result of the operation of the relay R2180, at its contacts 2181, it connects ground potential by way of the contacts 2061, conductor 513PM extending to Fig. 2 and then by way of the contacts on operated ones of the party station relays to mark the conductors 1891P1 to 1896P0X in order to identify the position of the calling station on a calling party line or to identify the fact that the calling subscriber station is an individual station on an individual P. A. B. X or P. B. X line.

Finally, at its contacts 2184, the relay R2180 completes a circuit including the contacts 2011′ and 2067 for operating the detector signal relay R2170. This relay upon operating, will apply the appropriate potential to the conductor 272LS in order to control the detector 1900 to identify and to register the last five digits of the directory number of the calling subscriber station in the calling line number register schematically shown in the call recorder 2000 portion of the director in Fig. 2.

Before proceeding with the control exercised by the detector signal relay R2170, the control of the detector cut-in relay R570 will first be described. This relay operates in multiple with an operated one of the units relay 901 and in series with the marginal detector test relay R2180 in the call recorder 2000. As soon as the relay R570 operates it prepares, at its contacts 573, a holding circuit for itself in series with the resistor 577 and the conductor 524KA whereby the relay will remain in its operated position after its initial operating circuit is interrupted by the contacts 582.

As a further result of the operation of the relay 577, at its contacts 576, it connects the +90 volt battery 665 (Fig. 6) by way of the resistor 666, contacts 15 on the normally operated multi-contact connect relay R510B, contacts 576, contacts 18 on the normally operated relay R510B, conductor 662GP extending to Fig. 4, resistor 471 and the plate electrode of the signal tube 470. The conductor 662GP is also multiply connected to the corresponding signal tubes, such as 470, by way of an associated resistor, such as 471, in all of the different 100 access groups, such as the 1100 group in the detector 1900. The 1200 group 401 includes, for example, the digital tube 470′ and all of the other groups are each provided with a corresponding signal tube connected in exactly the same manner as the signal tube 470. The tube 470 is a cold cathode tube, for example, of the type 5823 manufactured by the Radio Corporation of America. Thus, all of the corresponding tubes in the detector 1900 have positive 90 volt battery potential applied to the associated plate electrode.

As a further result of the operation of the detector cut-in relay R570, at its contacts 575, it completes a circuit including the contacts 103 on the normally operated connect relay R510A for operating the guard control relay R505 provided in the detector monitory and by-pass circuit 760′. The portion of the latter circuit including the guard control relay R505 and lamp L507 are shown in Fig. 5, as noted above, whereas the remaining portion of the detector monitory and by-pass circuit 760 is schematically illustrated in Fig. 7. The operation of the relay R505 completes an obvious circuit, including its contacts 506, for illuminating the lamp L507 to indicate to the exchange attendant that the detector 1900 is now in operation.

As a further result of the operation of the relay R570, at its contacts 572, it prepares a point in the locking circuit for the lower winding of the relay R530 and, at its contacts 571, it connects the ground potential at the contacts 581 to the upper winding of the relay R530. The latter circuit prepares the relay R530 for operation in the event two or more stations are simultaneously detected in different hundreds groups. This relay will not operate if only one station is detected.

Finally, at the contacts 574, the relay R570 interrupts a point in the normally closed holding circuit for the first of the three timing relays R560, R550 and R540. Consequently, the slow-to-release timer relay R560 will now slowly restore to normal, upon restoration it opens, at its contacts 562, the normally closed circuits for the second timing relay R550. The latter relay will then slowly restore to normal and interrupt, at its contacts 551, the normally closed circuit for the relay R540 so that the last timing relay may now slowly restore to normal. The cascade release time of the respective relays R560, R550, and R540 is the maximum time allotted for the completion of the detection cycle by the detector 1900. If these relays should restore before a detection cycle has been completed and has caused the operation of the relay R520, then the relay R540 will cause an incomplete detection registration to be made in the call recorder 2000 portion of the associated director.

In the present description of the operation of the system, it was assumed that the call was initiated by the subscriber at the first party station 201P1 on the party line 202–203 (Fig. 1). As a result of a call from this station, the relays R1870P5 and R1870P1 of the party station relays in the coder 1800 (Fig. 2) are locked in their operated positions. Consequently, when the detector 1900 is available for use and the detector assigner 1910A assigns the director 300X to the detector 1900, the previously described operations will take place. In this connection it will be recalled that the marginal detector relay R2180, at its contacts 2181, connects ground potential by way of the contacts 2061, conductor 513PM extending to Fig. 2, then by way of the contacts of the party station relays to conductor 1891P1 to mark the latter conductor as an indication that the first station on a party line has initiated the call. As soon as the director detector connect relay R1910 connects the call recorder 2000 portion of the director to the detector 1900, the ground potential on the conductor 1891P1 is further extended to the conductor 1891MP1 extending to Fig. 6 and then by way of the contacts 3 on the normally operated connect relay R510B in order to operate the party relay R630–1. Each of the relays R630–1 to R630–5, inclusive, respectively correspond to the five different stations on a five-party line and whenever a station on a party line initiates a call, the corresponding relay in the detector 1900 will be operated when the detector is assigned for the exclusive use of the connected director. The relay R610 is operated whenever an individual line initiates the call and the relay R620 is operated whenever a call is initiated on a P. A. B. X. or a P. B. X. line.

As soon as the relay R630–1 operates, it connects ground potential, at its contacts 632, to the previously described circuit for the guard control relay R505 and, at its contacts 631, it prepares a point in the circuit including the upper winding of the double detect relay R530 so that ground potential, at contacts 581, may now be connected by way of the contacts 571, upper winding of the relay R530, contacts 631, contacts 12 on the operated connect relay R510B, conductor 651PC1 extending to Fig. 4 where it terminates on the terminal TB412 individual to the 1100 group of the detector 1900. The conductor 651PC1 is multiply connected to all of the different hundreds groups, such as 1100, terminating subscriber lines of first subscriber stations on party lines. In other words, it is immaterial at the present time as to what hundreds group includes the directory number of the calling party station but all hundreds groups terminating first stations on party lines will be conditioned for operation by the application of the resistance ground potential to the terminal in each hundred ground corresponding to the terminal TB412.

At this time, it may be well to digress a moment to explain the controls exercised in response to the operations of relays R630–2 to R630–5 in the event these relays have been selectively operated to identify the corresponding positions of party subscriber stations on party lines. Each of the relays performs the same functions as the relay R630–1 but instead of applying resistance ground potential through the upper winding of the double detect relay R530 to the conductor 651PC1, they each in turn, through their associated contacts 633, 635, 637 or 639 will apply the marking potential to the respective conductors 652PC2, 653PC3, 654PC4 or 655PC5. These conductors are respectively connected to terminals, such as the terminal TB412, in the different hundreds groups, such as 1100 and 1200, serving the lines of party subscriber stations having the corresponding directory numbers. If each hundreds group, such as the 1100 group, in the detector 1900 is provided with the same number of terminals as the terminal block TB412 for each of the different stations on the party lines, then the installer can be instructed to cross-connect the circuit for the group marking relay, such as R420, to the particular terminal, such as TB412, terminating the particular marking conductor corresponding to the position of the stations on the party line being served by the hundreds group. Thus, each hundreds group may be allotted for a particular station on a party line and all lines that are to be identified by the particular hundreds group must be in the same position on all party lines in the same hundred group. Furthermore all hundreds groups arranged to identify the first stations on party lines and individual lines in the corresponding hundreds groups will be connected to the conductor 651PC1 at a terminal corresponding to the terminal TB412.

At the present time all hundreds groups corresponding to the 1100 group, are in condition to be operated because the resistance ground potential has been connected to the terminal, such as TB412, of all hundreds groups having access to subscriber stations that are first stations on party lines and to individual line stations in the same hundreds groups.

Referring now to the detector signal relay R2170 (Fig. 3) it will be noted that at its contacts 2172, it normally applies direct ground potential to the conductor 272LS1 and as soon as the relay operates it first closes its X contacts 2174 to apply the positive 90 volt battery potential to the conductor 271LS through the resistor 2186 while the ground potential is removed therefrom. Thereafter, the positive 90 volt battery potential is applied directly to the conductor 272LS through the contacts 2173. The contacts 2174 are provided to insert the resistor 2186 in the circuit during the transitory period between the opening of contacts 2172 and the closing of contacts 2173. It may be well to mention at this time that the direct ground potential is normally applied by way of the conductor 272LS extending to Fig. 1, then by way of the wiper 257 on the director hunter 250, conductor 305LS, primary selector 300, finder 240, wiper 236 on the finder 240, associated bank contact and conductor C231, line circuit 205 and the C conductor in the cable 204 in order to maintain the line finder 240 and line circuit 205 in their operated positions and to mark the party line, including the conductors 202 and 203, busy to all of the connectors in the exchange having access to the terminals on the calling party line. This direct ground potential is also applied to all of the S leads, such as C1100, C1200 etc., in the cable C460 extending to the detector, but it will have no effect on the operation of the detector 1900.

As soon as the detector signal relay R2170 in the call recorder 2000 portion of the director operates it substitutes the positive 90 volt battery potential for the direct ground potential on the conductor 272LS and the corresponding conductors, such as the conductors C1100, C1200, etc., in the cable C460. The positive 90 volt potential applied to these conductors is sufficient to break down one of the gas filled discharge tubes, such as C1100, in each of the hundreds groups corresponding to the last four digits in the directory numbers of each of the stations on the calling party line.

Referring to the 1100 access group 400, in the detector 1900, it will be seen that the positive 90 volt battery applied to the conductor C1100 individual to the calling station 201P1 will be applied to the left-hand electrode of the gas filled discharge tube G1100. The right-hand electrode of the gas filled discharge tube G1100 is connected to negative exchange battery of approximately 50 volts over the circuit including the resistor R1100 and the windings of the group relay R410. The potential difference across the right and left hand electrodes of the gas filled discharge tube G1100 is now approximately 140 volts and causes the tube to break down and become conductive. As soon as the tube becomes conductive sufficient current will flow therethrough to cause the group relay R410 to operate and close its contacts 411. All of the gas filled discharge tubes, such as G1100 provided in the detector 1900, are preferably type NE–2 neon glow lamps manufactured by General Electric Co. and the resistors, such as R1100, included in the circuit in each of the tubes is preferably a 27,000 ohm one-half watt resistor.

In the above description, the circuit was traced to control the tube G1100 individual to the calling station 201P1. However, the 90 volt positive potential when extended over the previously described circuit to the conductor C1100 individual to the calling station 201P1 is also extended by way of the multiple conductors C1200, C1300, C1400 and C1500 corresponding respectively to the stations 201P2 to 201P5. These conductors extend to the correspondingly desginated gas filled tubes (not shown) in the 1200, 1300, 1400 and 1500 access groups so that each one of the corresponding gas filled tubes is rendered conductive and will complete the operating circuit for the associated group relay, corresponding to the relay R410, in each of the corresponding hundreds group. Therefore, five gas filled tubes G1100, G1200, G1300, G1400 and G1500 in the corresponding hundreds groups in the detector 1900 will all be simultaneously rendered conductive and the five group relays, such as R410, in the corresponding groups will be operated. Each of the foregoing hundreds groups is provided with the terminals corresponding to the terminal TB412, respectively terminating the marking conductors 651PC1 to 655PC5 inclusive, corresponding to the respective five stations on five-party lines.

In the present example, only the marking conductor 651PC1 is grounded because only the relay R630–1 of the five-party relays of Fig. 6 have been operated. The ground potential on the conductor 651PC1 is extended by way of the key 413, contacts 411 and the winding of the group marking relay R420, to battery, in order to operate the latter relay. Although the corresponding contacts, such as 411, in the circuit for the group marking relays in each of the four remaining different hundreds access groups in the detector 1900 have been closed by the group relays, corresponding to the relay R410, the associated group marking relay, such as R420, will not operate because the associated marking conductors, such as 652PC2 to 652PC5, individual to the corresponding hundreds access groups will not be grounded. Accordingly, only the group marking relay R420 operates at this time.

The group marking relay R420, at its contacts 421, locks itself to the grounded marking conductor 651PC1 over a circuit that is independent of the contacts 411 on the group relay R410. As a further result of the operation of relay R420, it closes its contacts 423 to 428, inclusive, to apply marking ground potential to various terminals on the terminal block TB440. Accordingly, the third digit of the calling office code which in the present example is the digit 3, is marked in code form on the W1 and Z1 marking conductors extending to Fig. 2. Since the calling subscriber station number is in the 1100 group, the thousand digit 1 is marked in code form on the W2 and X2 marking conductors extending to Fig. 2. Finally, the hundreds digit 1 is marked on the W3 and X3 marking conductors extending to Fig. 2. Thus, the WXYZ1 code marking conductors are marked in accordance with the exchange number of the calling exchange code which, as stated above, is the digit 3 because the calling subscriber station is assumed to be terminated in the FLorida 3 exchange. The remaining two sets of WXYZ2 and WXYZ3 code marking conductors respectively correspond to the thousands and hundreds digits of the numerical portion of the directory number of the calling subscriber substation 201P1. These conductors terminate respectively in the WXYZ1, WXYZ2 and WXYZ3 calling line number registers provided in the call recorder 2000 portion of the calling director through contacts on the operated connect relay R1910 and these registers are now controlled to register the digits 311 as indicated above.

If the calling subscriber, at 201P2 instead of 201P1 initiated the call, then the operation of the group relay in the 1200 group would cause the group marking relay (corresponding to the group marking relay R420) in the 1200 group to also be operated. The contacts on the group marking relay in the 1200 group would mark the digits 312 on the corresponding code marking conductors extending to the calling line number registers so that the digits 312 instead of 311 would be registered therein. The same operations would occur if the call is initiated by any one of the other stations on the party line 202—203. In the latter case, however, the digits corresponding to the office digit and the thousands and hundreds digits would be registered in the calling line number register of the call recorder 2000 portion of the director.

Referring again to the 1100 access group and the operated condition of the group marking relay R420 therein, it will be seen that as soon as the latter relay operates, it also closes its contacts 422 in order to complete an obvious circuit for operating the group connect relay R430. This relay is schematically illustrated with 100 make contacts designated 00 to 99, inclusive, that terminate respectively the identifying conductors C1100 to C1199, inclusive. In addition to the foregoing, the relay R430 also includes the contacts 101 and 102. It should be understood that while only one relay R430 has been illustrated, it is apparent that a plurality of relays each having, for example, ten contacts, could be simultaneously operated from the ground potential at contact 422 to simultaneously close sufficient contacts to control the illustrated circuits. In any event, the closing of the contacts 00 to 99, inclusive, will extend the one-hundred conductors C1100 to C1199, inclusive, to the tens and units marking relays R00 to R99, inclusive. It should be understood that while only two of the one-hundred relays have been shown and designated R00 and R01, the remaining 98 relays are connected, in substantially the same manner as the above mentioned relays, to 98 correspondingly designated identifying conductors. It should also be understood that each of the tens and units marking relays are connectable through contacts 1 to 100, inclusive, on the normally operated connect relay R510A to all of the corresponding contacts on all of the group connect relays, such as R430, in all of the different hundreds access groups provided in the detector 1900.

Each one of the tens and units marking relays is provided with certain make contacts which are closed in response to the operation of its associated relay to mark the two sets of WXYZ4 and WXYZ5 marking conductors in accordance with the respective tens and units digits corresponding to the particular designation of the operated relay. By means of the tens and units marking relays, the tens and units digits of the directory number of any calling subscriber substation may be ascertained and registered in the WXYZ4 and WXYZ5 calling line number registers in the call recorder 2000 portion of the associated director.

In the present example, the operation of the group connect relay R430 connects the 100 identifying conductors C1100 to C1199 to the correspondingly designated tens and units marking relays, R00 to R99, inclusive. At the present time, the conductor C1100 has the positive 90 volt potential applied thereto and has caused the G1100 gas filled tube to be conductive. This potential is applied to the winding of the relay R00 in the tens and units marking relays to operate the same as soon as the group connect relay R430 operates in the manner described above. At its make contacts, the operated relay R00 applies the marking ground potential to the Z4 and Z5 code marking conductors extending to Fig. 2 in order to register the digit 0 in both the tens register WXYZ4 and the units register WXYZ5 of the calling line number register provided in the call recorder 2000 portion of the calling director. Also, the operated tens and units marking relay R00 completes an obvious circuit for operating the detection complete relay R520 in order to signal the control circuit group A portion of the detector 1900 that the detection cycle for ascertaining the identity of the directory number of the calling subscriber at substation 201P1 has been completed.

Referring now to the call recorder 2000 portion of the director, as schematically illustrated in Fig. 2, it will be seen that when the different registers in the calling line number register are marked in code form in accordance with the digits, 31100 the relays (not shown) in the registers WXYZ1 to WXYZ5, inclusive, will operate in the well known manner to register the respective digits and they will lock in their operated positions to ground potential at the contacts 2011' on the operated AB toll relay R2010 in the call recorder 2000. The five digits noted above identifying the last five digits of the directory number of the calling station will be stored until they are subsequently transferred by the director 300X to the associated toll ticket repeater, such as X2300 or X2300NT so that a record may be made of the calling station number.

It will be recalled that the cold cathode signal tube 470 has positive 90 volt battery applied to its plate electrode through the resistor 471. This potential is also applied to the corresponding electrode of each of the signal tubes individual to each of the hundreds access groups of identifying units provided in the detector 1900. As soon as the group relay R430 individual to the 1100 access group operates, it closes its contacts 102 to connect the start electrode of the signal tube 470 by way of the resistor 472, contacts 102, conductor 663GS extending to Fig. 6, contacts 642, resistor 664 and the positive terminal of the 90 volt battery 665. The start electrode of the tube 470 is now at substantially the same potential as the plate electrode thereof and causes the tube to ignite and glow with a cold blue light to indicate the particular hundreds access group in which the calling station has been detected. All of the remaining signal tubes, corresponding to the tube 470, associated with all of the remaining hundreds access groups in the detector 1900 will remain non-conductive. If more than one signal tube, such as 470, is ignited at the same time, it will indicate that a fault has occurred in that a double detection has been made. The illuminated condition of the two or more signal tubes, such as 470, will identify each one of the particular hundreds access groups in which detection has occurred.

The ground potential at the contacts 101 on the operated group connect relay R430 extends to the winding of the guard control relay R505 (Fig. 5) in order to retain the latter relay operated.

*Release of the detector 1900*

In the above description, it was pointed out that as soon as one of the tens and units marking relays is operated, the detection complete relay R520 operates. Thus, when the last five digits of the calling subscriber directory number are registered in the calling line number register of the associated call recorder 2000 portion of the director, the detector 1900 can be released. The relay R520, at its contacts 521, completes the operating circuit for the timer relay R560 which will reoperate to close its contacts 562 and will reenergize the second timer relay R550. In other words, the timing period controlled by the sequential release of each of the slow to release timer relays R560, R550 and R540 will be terminated as soon as the detection complete relay R520 operates. It is only when the latter relay has been delayed in its operation that all of the above mentioned timer relays will have sufficient time to restore to normal.

As a further result of the operation of the relay R520, at its contacts 522, it completes an obvious circuit for operating the disconnect relay R580. The relay R580 in turn locks itself by way of its contacts 583 to ground potential applied to the conductor 211MGC. It should also be noted that the final control exercised by the detection complete relay R520 includes its contacts 523 which applies ground potential from the contacts 534 by way of the contacts 104 on the operated connect relay R510A to the conductor 1961MEB extending to Fig. 2, then by way of one of the contacts on the operated director-detector connect relay R1910, conductor 1961EB extending to Fig. 3 and the winding of the detection complete relay R2060, to battery. The latter relay upon operating, locks itself by way of its contacts 2068 to ground the contacts 2011'. This relay also indicates to the call recorder 2000 portion of the director that the detector 1900 has completed the detection of the directory number of the calling subscriber station. Further controls by the detection complete relay R2060 will be described hereinafter.

Referring again to the disconnect relay R580 (Fig. 5) in the control circuit group A of the detector 1900, it will be seen that at its contacts 581 it interrupts a point in the circuit including the contacts 571 and the upper winding of the double detection relay R530. This relay, although included in the circuit of the operated group marking relay R420 in the detector 1900, does not operate due to the resistance of the operated group marking relay. However, if two of the group marking relays, corresponding to the relay R420, should be operated in multiple with the circuit for the upper winding of the double detection relay R530 before the ground potential is removed at the contacts 581, then sufficient current will flow through the double detection relay R530 to cause it to operate. In other words, the double detection relay is adjusted so that it will not operate in series with one group relay, such as R420, but will immediately operate over a multiple circuit consisting of two or more group marking relays.

At the present time, however, the relay R530 has not operated so that the interruption of the circuit at contacts 581 will cause the restoration of the operated group marking relay R420, in the 1100 access group of identifying conductors.

As a further result of the operation of the disconnect relay R580, it opens its contacts 582 in order to remove the short circuit from around the resistor 577 and contacts 573. This places the resistor 577 in the circuit including the winding of the detector cut-in relay R570 and in multiple therewith, the winding of the units relay R920S-1 in the detector assigner 1910A and in series with the winding of the marginal detector test relay R2180 in the call recorder 2000 portion of the director. The resistor 577 included in this circuit will hold the relay R2180 in its operated position in the event that the detector 1900 is controlled by a defective detector release. The resistor 577 included in the above circuit also prevents other directors from seizing the detector 1900 during the normal release operation of the latter equipment.

Referring again to the detection complete relay R2060 in the call recorder 2000 portion of the director, it will be recalled that this relay operated under control of the contact 523 on the detection complete relay R520 in the control circuit group A portion of the detector 1900. Also, the relay R2060 locks itself by way of the contacts 2068' to ground at contacts 2011'. At the contacts 2068, the relay R2060 interrupts a point in the previously described circuit for the detection signal relay R2170 in order to replace the positive 90 volt battery potential on the conductor 272LS with the regular direct ground potential. In this manner the detection control positive 90 volt potential is removed from the different C conductors in the cable C460 in order to terminate the conductive condition of the different gas filled tubes, such as G1100, associated with the identifying conductors in the different hundreds groups in which the different stations on the calling party line are included. As soon as the gas filled tubes, such as G1100, are rendered nonconductive, the associated group relay, such as R410, included in the circuit of the corresponding gas filled tubes will restore to normal.

As a further result of the operation of the detection complete relay R2060, at its contacts 2061, it interrupts a point in the circuit including the conductor 513PM extending to Fig. 2 in order to remove the specific marking from one of the marking conductors corresponding to the position of the calling station on a party line or a P. A. B. X. or a P. B. X. line or an individual line. In the illustrated example, the conductor 513PM is connected to the station identifying marking conductor 1891P1 which extends by way of the conductor 1891MP1 extending to Fig. 6 to operate the first station party identification relay R630–1. As soon as the ground potential is removed from the conductor 513PM by the contacts 2061 on relay R2060, the relay R630–1 will restore to normal.

As a further result of the operation of relay R2060, at its contacts 2066, it disconnects the time pulse conductor 443MS3 from the circuit of the detection failure relay R2160 so that the latter relay cannot be operated on a call in which the detection has been satisfactorily completed by the detector 1900.

At the contacts 2063, the relay R2060 interrupts a point in the circuit including the conductor 1963BR3 in order to restore the director-detector connect relay R1910. The restoration of the multi-contact relay R1910 will disconnect all of the conductors in the call recorder 2000 portion of the calling director from the conductors extending to the detector 1900.

Finally, at the contacts 2062 and 2065, the detection complete relay R2060 interrupts points in the circuits including respectively the conductors C2026TM11 and C2026CPR111 extending to the second tens group 700B portion of the assigner 1910A (Fig. 8). The removal of ground potential from the conductor C2026TM11 causes the restoration of the relay R820–11 in the detector assigner 1910A. The removal of the resistance battery potential (through the winding of the detector test relay R2180) from the conductor C2027CPR111 causes the restoration of the relay R920S–1 in the units relays 901 portion of the detector assigner 1910A (Fig. 9) and the simultaneous restoration of the detector cut-in relay R570 in the control circuit group A portion of the detector 1900 (Fig. 5). Before discussing the controls exercised by the restoration of the relay R820–11, R920S–1 and R570, the restoration of the detector test marginal relay R2180 will first be described.

The relay R2180, as noted above, is included in the circuit extended over the above mentioned cross-point return conductor C2027CPR111. As soon as this circuit is interrupted, at the contacts 2065, the relay R2180 restores to normal to place the call recorder 2000 portion of the director in the same position that it was prior to the initiation of the operation of the detector 1900. However, the detection complete relay R2060 remains locked in its operated position under control of contacts 2011′ on the AB toll relay R2010 in order to prevent the call recorder 2000 from being reconnected to the detector 1900.

Referring now to the party relay R630–1 (Fig. 6) in the control circuit group A portion of the detector 1900, it will be seen that as soon as the relay restores to normal it interrupts, at its contacts 632, the point in the circuit for retaining ground potential on the conductor 211MGC. The disconnect relay R580 and the guard control relay R505 are both locked to the conductor 211MGC which is still grounded by the operated group connect relay R430 in the 1100 access group of identifying conductors. In the latter group, it will be recalled that the group marking relay R420 is locked in its operated position over a circuit including its contacts 421, the key 413, terminal TB412, conductor 651PC1 extending to Fig. 1, contacts 12 on the operated connect relay R510B, contacts 631 on the party relay R630–1, upper winding of the double detection relay R530, contacts 571 and 581 to ground. The previously described operation of the disconnect relay R580, at its contacts 581, opened a point in the above traced circuit to initiate the release of the slow-to-operate group marking relay R420. When this relay subsequently restores to normal, it interrupts its locking circuit, at its contacts 421, and, at its contacts 423 to 428, inclusive, it removes the marking potentials corresponding to the digits 311 from the WXYZ1, WXYZ2 and WXYZ3 code marking conductors. Finally, at the contacts 421, the relay R420 interrupts a point in the circuit for the multi-contact group connect relay R430. This relay now restores to normal thereby to disconnect the 100 identifying conductors C1100 to C1199, inclusive, from the correspondingly numbered tens and units marking relays in Fig. 5. Also, at the contacts 101, the relay R430 removes an additional ground potential from the conductor 211MGC included in the circuit of the guard control relay R505. Finally, at the contacts 102, the group control relay R430 disconnects the circuit for the starting electrode of the signal tube 470 from the conductor 663GC thereby to disconnect the positive 90 volt battery 665 from the starting electrode.

The operated tens and units marking relay R00 is restored to normal as a result of the substitution of the direct ground potential on the conductor 272LS for the positive 90 volt battery in response to the restoration of the detector signal relay R2170 in the call recorder 2000 portion of the director. However, if the group connect relay R430 is restored prior to this time, then the relay R00 will restore to normal under control of the contacts on the group connect relay R430. The relay R00 in turn will remove the marking potentials corresponding to the digits 0 from the WXYZ4 and WXYZ5 code marking conductors. Also, at its make contacts, the relay R00 interrupts the circuit for the detection complete relay R520 which also restores to normal. The latter relay interrupts, at its contacts 521 and 522, points in the operating circuits for the relays R560 and R580. However, the relay R560 will now remain operated under control of the contacts 574 on the detector cut-in relay R570 since the latter relay restored to normal when the detection complete relay R2060 opened its contacts 2065. Consequently, the relay R560, at its contacts 562, retains the relay R550 in its operated condition and the latter relay retains the relay R540 in its operated position.

The disconnect relay R580 now restores to normal inasmuch as the conductor 211MGC no longer has ground potential applied thereto. At the contacts 581 and 582 the relay R580 prepares points in the circuits for initiating operation of the detector 1900. At this time, the guard control relay R505 also restores to normal since the conductor 211MGC no longer has ground potential thereon and it in turn, at its contacts 506, extinguishes the signal lamp L507.

The detector 1900 is now fully restored to normal and is conditioned to be reconnected by the detector assigner 1910A to any director in the exchange that requires the identification of the directory number of a calling subscriber station. It should be noted that the connect relay R510A and the connect relay R510B (Figs. 5 and 6) in the control circuit group A portion of the detector 1900 are retained operated over a multiple circuit including the resistor 592, conductor 593LA extending to Fig. 7, contacts 748 and 738, contacts 1 on the detector transfer key K752 and ground at contacts 759 on the relay R758 in the detector monitor and by-pass circuit 760. This circuit, as will be described subsequently, may be utilized to disconnect the control circuit group A portion (Figs. 5 and 6) of the detector 1900 by restoring the above mentioned connect relays and for instead connecting up the control circuit group B portion 761 of the detector 1900. The control circuit group B portion 761 of the detector 1900 is schematically shown in block diagram form on Fig. 7. It should be understood, however, that this control circuit is exactly the same as the control circuit group A portion of the detector shown in Figs. 5 and 6.

Referring now to the detector assigner 1910A (Fig. 8) it will be seen that as soon as the relay R820–11 restores to normal, it interrupts the circuit of the relay R820S–11 which also restores to normal. The latter relay, at its contacts 1 to 10, inclusive, disconnects the conductor C2026CPR111 individual to the director 111 and the corresponding conductors C2027CPR110 and C2027CPR112 to C2027CPR119 individual to nine other correspondingly numbered directors from the circuit including the windings of the ten units relays 901 (Fig. 9). As soon as the relay R820–11 restores to normal it completes, at its contacts 823, the circuit for reoperating the connect relays R710 and R810. This circuit may best be traced from battery by way of the windings of the relay R710 and R810, contacts 829, corresponding contacts on the relays R820–13 to R820–19 (not shown), contacts 826, 823, 729, corresponding contacts on relays R720–03 to R720–09 (not shown), contacts 726, 723 and 831, to ground. These relays both operate and at their respective contacts 1 to 10, inclusive, reconnect the ten relays in the first tens group 700A to the ten conductors 01 to 00, inclusive, in the cable 701 and the ten relays in the second tens group 700B to the ten conductors 11 to 10, inclusive, in the cable 801.

In the units relays 901, the relay R920S–1 restores to normal when the conductor C2027CPR111 is disconnected by the restoration of relay R820S–11. The relay R920S–1, at its contacts 922, interrupts a point in the locking circuit of the relay R920–1 so that the latter relay now restores to normal. At its contacts 923, the relay R920–1 completes a circuit including battery, winding of the connect relay R910, contacts 923, 928, corresponding contacts on relays R920–3 to R920–9 (not shown), contacts 933 and 831, to ground. The relay R910 now operates, and at its contacts 1 to 10, inclusive, prepares points in the operating circuit for the ten relays R920–1 to R920–10 inclusive, in the units relays 901. The detector assigner 1910A is now fully restored to normal and is in condition to be operated by another director in order to connect the same to the detector 1900.

In view of the foregoing explanation of the mode of the operation of the detector 1900 and the detector assigner 1910A, it will be understood that the calling director 300X that has been assigned the director number 111 is connected, by the detector assigner 1910A, to the detector 1900 when the directory number of the calling subscriber station is to be obtained. The detector 1900 in turn, upon detecting the number of the calling subscriber station, controlled the calling line number registered in the call recorder 2000 portion of the calling director to register therein the C digit of the calling exchange code and the last four digits of the calling subscriber directory number.

*Operation of the detector assigner 1910A to connect a plurality of directors to the detector 1900*

In the previous description of the operation of the detector assigner 1910A to connect the calling director 300X having the arbitrary designation 111 to the detector 1900, it was assumed that only the director 300X was calling at a time when the assigner 1910A and the detector 1900 are idle. It is apparent from the previous description that the director number 111 caused the operation of the specific relays R820–11 and R820S–11 in the second tens group 700B portion of the detector assigner 1910A and it caused the operation of the relays R920–1 and R920S–1 in the units relays 901 portion of the detector assigner 1910A. If any one of the remaining 99 directors assigned the arbitrary designations 100 to 109, 110, and 199, inclusive, requires the use of the detector 1900, the relays in the second tens group 700B portion of the detector assigner 1910A will be operated in substantially the same manner as previously described in connection with the operations thereof when the director having the arbitrary designation 111 required the use of the detector. The same operations will be performed by corresponding relays in the first tens group 700A portion of the detector assigner 1910A in order to connect any one of the 100 directors having the arbitrary designations 000 to 099, inclusive, to the detector 1900. The cross-point return conductors individual to the above mentioned 100 directors are connected to the contacts of the different relays R720S–01 to R720S–00 in the same manner as the similarly numbered conductors individual to the 100 directors having the hundreds digit 1 instead of the hundreds digit 0. Thus, each of the 100 directors having the hundreds digit 0, as well as each of the 100 directors having the hundreds digit 1, may be individually associated with the common detector 1900 under control of the detector assigned 1910A in substantially the same manner as the director 111 is connected to the detector 1900.

The operation of the detector 1900A is substantially the same regardless of the number of directors that simultaneously require information regarding the identity of the calling station connected to the associated directors. However, it should be understood that during periods of heavy traffic, many directors in the different tens groups 700A and 700B, may simultaneously require detection information. When this occurs, the detector assigner 1910A automatically performs a gating control whereby it will accept and lock-in all of the directors simultaneously requiring detection information and will connect each one of the locked-in directors to the detectors one at a time, until all locked-in directors have been individually connected to the detector and have received the information regarding the directory number of the calling station. After all of the directors have received the information, then the gate control facilities will accept another group of calling directors and will lock-out all additional directors until the second group of locked-in directors have been taken care of.

In order to describe this operation, it will be assumed, by way of example, that the directors 010, 011, 001 and 002 connected to the first tens group 700A and the directors 111, 112, 121 and 122 connected to the second tens group 700B portions of the detector assigner 1910A simultaneously require detection information. Under this condition, the conductors C2026TM01, C2026TM00, C2026TM11 and C2026TM12, are individually grounded by the respective directors. It should be noted that these conductors are common respectively to ten directors in the 01X group, the 00X group, the 11X group and the 12X group of directors, where the X refers to the units digits of the ten individual directors in the corresponding groups. Simultaneously therewith, the cross-point return conductors

C2027CPR010, C2027CPR011, C2027CPR001, C2027CPR002, C2027CPR111, C2027CPR112, C2027CPR121 and C2027CPR122 individual to each of the correspondingly numbered directors are connected to battery potential through the marginal detector test relays, such as R2180, in each of the individually associated directors.

When the detector assigner 1910A is idle, the connect relays R710 and R810 in the first and second tens groups 700A and 700B and also the connect relay R910 in the units relays 901 will operated from ground potential, at contacts 831, to prepare the initial operating circuits for the relays in the assigner 1910A. In the assumed condition described above, the conductor C2026TM00, C2026TM01, C2026TM11 and C2026TM12 in the cable C802 (Fig. 5) have ground potential applied thereto by directors in the associated groups. The ground potential applied to the conductors C2026TM00 and C2026TM01 in the cable C802 complete circuits including the normally closed contacts 00 and 01 on the relay R830, conductors 00 and 01 in the cable 701, in order simultaneously to operate the relays R702-01 and R720-00. The ground potential applied to the conductors C2026TM11 and C2026TM12 complete circuits including the closed contacts 1 and 10 on the relay R830, conductors 11 and 12 in the cable 801, in order simultaneously to operate the relays R820-11 and R820-12. The above noted operated relays in the first and second tens groups 700A and 700B portions of the detector assigner 1910A will now lock in their operated positions over circuits that are independent of the closed contact on the operated connect relays R710 and R810. At the contacts 722, the relay R720-01 prepares a circuit for its associated slave relays R720S-01, and the relay R720-00 prepares, at its contacts 728, a point in the circuit for its associated slave relay R720S-00.

In the second tens group 700B, the operated relays R820-11 and R820-12 at their respective contacts 822 and 825 prepare points in circuits for the respective slave relays R820S-11 and R820S-12. At the break contacts 723, 729, 823 and 826, the operated relays R720-01, R720-00, R820-11 and R820-12 interrupt points in the series circuit for the connect relays R710 and R810 in order to restore these relays and to prevent operation thereof until the contacts are again closed. The relays R710 and R810 now restore to normal and at their respective contacts 1 to 10, inclusive, the initial operating circuits for the ten R720 relays and the ten R820 relays are disconnected. However, the operated relays R720-01, R720-00, R820-11 and R820-12 all remain in their operated positions over locking circuits that are independent of the contacts on the relays R710 and R810.

At the present time, all of the calling directors in the exchange that require detection information from the detector 1900 are locked into the detector assigner 1910A and all other directors in the exchange are temporarily locked-out and prevented from gaining access to the detector assigner 1910A. However, directors that are included in the same group of ten directors as those that have been locked-in to the detector assigner 1910A may gain access and be included in the locked-in group up until the time that operated units relays 901 have restored relay R910. As soon as relay R910 restores to normal, other directors in the same tens group as the director or directors connected to the units relays R901 cannot be locked-in to the detector assigner 1910A.

In view of the foregoing, it will be appreciated that marking conductors in the cables 701 and 801 cannot operate any additional relays in the first tens group 700A or in the second tens group 700B after the respective connect relays R710 and R810 have been restored to normal. It will also be appreciated that any of the directors in the groups that have been locked into the assigner 1910A by the operated ones of the relays in the first and second tens groups 700A and 700B may be admitted into the corresponding group up until the time that the units relays 901 are connected to the associated group in order to be controlled thereby and the corresponding connect relay R910 is restored.

The detector assigner 1910A is now in condition to begin operations whereby the locked-in directors will be connected to the detector 1900 one at a time until all of the locked-in directors have been taken care of. Consequently, at the present time the relay R720S-01 will be operated over a circuit which includes battery, winding of the relay, contacts 722 and ground at contacts 831 on the operated transfer A relay R830. Also, at the contacts 711, the relay R710 completes a circuit from ground at contacts 831 to illuminate the supervisory A lamp L762 to indicate to the exchange attendant that the detector assigner 1910A is in an assignment operating cycle.

The relay R720S-01 upon operating, as noted above, closes its contacts 1 to 10, inclusive, in order to connect the ten cross-point return conductors C2027CPR011 to C2027CPR019 and C2027CPR010 to the windings of the relays R920S-1 to R920S-10, inclusive, in the units relays 901 portion of the detector assigner 1910A. In the particular group of conductors now connected to the units relay 901, the conductors C2027CPR011 and C2027CPR010 have battery potential applied thereto through the windings of the marginal detector test relay, such as R2180, in the respective directors 011 and 010. The resistance battery potential applied to the two conductors noted above complete operating circuits for the relays R920S-1 and R920S-10. The associated marginal detector test relays in the respective directors will not operate at the present time due to the high resistance of the respective relays R920S-1 and R920S-10.

As soon as the relay R920S-1 operates, it completes, at the contacts 922, an obvious circuit for operating the relay R920-1. Simultaneously therewith, the relay R920S-10, at its contacts 932, completes an obvious circuit for operating the relay R920-10. As a result thereof, the relay R920-1 locks itself by way of the contacts 922 and its X contacts 921 to ground. Also the relay R920-10 locks itself by way of the contacts 932 to its X contacts 931, to ground. At the contacts 923 and 933, the respective relays R920-1 and R920-10 interrupt points in the circuit for the connect relay R910 which now restores to normal to interrupt points in the initial operating circuits for the remaining units relays 901. The locked relays in the group, however, will remain in their operated positions.

As soon as the connect relay R910 restores to normal it closes its contacts 911, whereupon the resistance battery that is applied to the cross-point return conductor C2027CPR011 to operate the relay R920S-1 is extended over a multiple path by way of the contacts 924, 911 and 832, conductor 524KA extending to Fig. 5, contacts 102 on the normally operated connect relay R510A, contact 582, and the detector cut-in relay R570, to ground. The relay R570 operates in multiple with the relay R920S-1 over a circuit that is in series with the detector test relay corresponding to the R2180, in the associated director 011 will operate.

Further operations in the detector 1900 and the call recorder 2000 portion of the now connected director 011 and the operation of the detector assigner 1910A is exactly the same as has been previously described. In other words, the detection operation now takes place whereby the last five digits of the directory number of the calling subscriber station will be registered in the calling line number register of the connected call recorder 2000 portion of the 011 director. Thereafter, the detector 1900 will be disconnected from the 011 director in the manner previously described and will thereby cause the restoration of the relay R920S-1 in the units relay 901 portion of the detector assigner 1910A. However, at this time, the operated relay R720-01 in the first tens group 700A will still remain locked to the conductor C2026TM01 that is common to the group of ten directors having the first and second digits 01. It will be recalled that this conductor was grounded by the directors assigned the three digit numbers 010 and 011.

As soon as the units relay R920S-1 restores to normal, it interrupts, at its contacts 922, the locking circuit for the relay R920-1 so that the latter relay now restores to normal. At its contacts 923, the relay R920-01 will attempt to recomplete the circuit for the connect relay R910 but this relay cannot operate at this time inasmuch as the relay R920-10 is retained in its locked position and has opened a point in the operating circuit, at its contacts 933, for the connect relay R910. As a further result of the restoration of the relay R920–1, at its contacts 925, it now connects the operating circuit, including the conducor C2027CPR010, for the relay R920S–1 by way of the contacts 934, contacts on restored units relay R920–3 to R920–9, contacts 930, 925, 911 and 832, conductor 524KA extending to Fig. 5 in order to again complete the operating circuit for the detector cut-in relay R570. The last-mentioned relay is restored to normal after the completion of each detection operation of the detector 1900. In view of the last mentioned circuit, the detector 1900 will now be individually associated with the call recorder 2000 portion of the director having the arbitrary designation 010. Accordingly, when the detection cycle of the detector 1900 has been completed and the last five digits of the directory number of the calling subscriber station is registered in the calling line number register of the call recorder 2000 portion of the now connected 010 director, the detector 1900 will be restored to normal and the associated 010 director will be disconnected from the detector assigner 1910A and the detector 1900.

As a result of the completion of the detection of the calling line number of the station connected to the 010 director, the circuit for the units relay R920S–10 will be interrupted so that the later relay restores to normal and opens the circuit for the relay R920–10 which also restores to normal. Since all of the ten directors in the group including the directors 011 and 010 have now been taken care of, the ground potential is removed from the associated tens marking conductor C2026TM01. Also, resistance ground potential is removed from the corresponding cross-point return conductors in the same tens group of directors, such as the conductors C2027SPR011 to C2027CPR019 and C2027CPR010 indicating that all of the directors in the group are in a restored position or do not require the use of the detector 1900. The relays R720–01 and R720S–01 will now restore to normal and since the units relays 901 are restored to normal the connect relay R910 is reoperated to prepare points in the initial circuits for operating any one of the relays R920–1 to R920–10, inclusive. Also, the restoration of the relays R720–01 and R720S–01 will prepare a circuit so that the next slave relay, such as R720S–00, can be operated to connect up the cross-point marking conductors individual to the directors in the corresponding group having the first and second digits 00 of the three digit identification number.

It may be well to mention at this time, however, that if any other director in the tens group having the first and second digits 01 should request detection information before the relays R720–01 and R720S–01 restore to normal, then these relays will be held in their operated positions and the corresponding relays in the units relay 901 will be operated to connect the particular calling director to the detector 1900. However, as soon as the pair of tens relays R720–01 and R720S–01 restore to normal, then all directors in that group will be locked-out until all other locked-in directors have been taken care of by the detector assigner 1910A.

After the restoration of the relays R720S–01 and R720–01, the ground potential at the contacts 831 will be extended by way of the contacts 723, 726, corresponding contacts (not shown) on relays R720–03 to R720–09, contacts 728 and the winding of the relay R720S–00, to battery. The latter relay now operates and connects the ten cross-point conductors including the marked conductors C2027CPR001 and C2027CPR002 individual to the calling 001 and 002 directors to the units relays 901. The conductors C2027CPR003 to C2027CPR009 and C2027CPR000 are also connected to the units relays 901 so that the corresponding directors may be locked-in, if they require the use of the detector 1900, before the associated relay R720S–00 is restored to normal.

In the units relays 901, the corresponding relays R920S–1 and R920S–2 will operate from the resistance battery potential applied to the conductors C2027CPR001 and C2027CPR002 by the correspondingly designated calling directors. The operated units relays R920S–1 and R920S–2 will cause the operation of the associated units relays R920–1 and R920–2 and the latter relays will cause the restoration of the connect relay R910. Thus, the calling directors in the same group will be locked into the units relays 901. Additional directors in the same group with the locked-in group of the calling directors may also be locked-in during the present assignment cycle. All other directors in the system will be temporarily locked-out from the detector assigner 1910A.

The assigner 1910A will now control the circuits so that the 001 director will connect with the detector 1900 and the latter circuit will be controlled to register the last five digits of the directory number of the calling subscriber station in the call recorder 2000 portion of the corresponding director in substantially the same manner as has been described.

The detector assigner 1910A will then connect the next director (002) in the same group to the detector 1900 so that the latter circuit can identify the calling station number and register the last five digits thereof in the call recorder 2000 portion of the 002 director.

After all of the calling directors in the group having the designations 001 to 009 and 000 have been taken care of by the director detector assigner 1910A, the relays R720S–00 and R720–00 will restore to normal to transfer the chain circuit including ground at contacts 831 to the circuit for the next operated group relay in the second tens group 700B. In the present example, it is assumed that the relay R820–11 is operated due to the fact that the 111 and 112 directors are in a calling condition. Consequently, the relay R820S–11 now operates to connect all of the cross-point return conductors C2027CPR111 to C2027CPR119 and C2027CPR110, inclusive, to the units relays 901. In this group, the calling 111 and 112 directors will cause the operation of the relays R920S–1 and R920S–2 in the units relays 901. Further operations are substantially identical to those previously described and it will be appreciated that the calling 111 and 112 directors will be successively connected to the detector 1900 so that the directory numbers of the calling subscriber stations connected to the directors will be registered respectively in the corresponding directors.

After all of the directors in this group have been taken care of by the detector assigner 1910A, the relays R820S–11 and R820–11 will restore to normal in order to transfer the chain circuit including ground potential at contacts 831 to the circuit for operating the relay R820S–12. This relay is the next group relay to operate due to the fact that the relay R820–12 individual to the group of ten directors having the first two digits 12 is in its locked position. As a result thereof, the cross-point return conductors C2027CPR121 to C2027CPR129, inclusive, and C2027CPR120 will be connected to the units relay 901 in the manner previously described. In this group, the calling 121 and 122 directors will again cause the operation of the units relays R920S–1 and R920S–2 so that the corresponding directors will be individually connected one at a time to the detector 1900 in the manner previously described.

After the directory number information has been registered respectively in the 121 and 122 directors, the relays R820–12 and R820S–12, as well as the corresponding units relays, R920S–1, R920–1, R920S–2 and R920–2 will restore to normal. As a result thereof, all of the locked-in directors will have been taken care of by the detector assigner 1910A and the locked-out directors may now be locked-into the detector assigner 1910A. Thus, as soon as all of the operated relays in the first tens group 700A and all of the operated relays in the second group 700B are restored to normal, the previously described series circuit will be completed for reoperating the connect relays R710 and R810. Also, all of the operated units relays 901 will be restored to normal so that the circuit is recompleted for operating the connect relay R910. The detector assigner 1910A is now in condition to be operated by all directors in the exchange that are in condition to require the use of the detector 1900 to identify the directory number of calling subscriber lines that are now connected to such directors.

It may be well to mention at this time that the detector assigner 1910A in connecting a director to the detector 1900 and the detection cycle of operation of the detector 1900 takes about 300 milliseconds. This period of time is sufficiently short, as compared to the normal director holding time, to permit all directors requiring detection information to be processed without delay even during very heavy traffic periods in the exchange.

*Transfer*

The present system includes a first detector assigner 1910A, illustrated in detail in Figs. 7 to 9, inclusive, and it also includes a second detector assigner 1910B, which is exactly the same as the detector assigner 1910A, and has therefore been schematically illustrated in block diagram form in Fig. 9.

With the assigner transfer key K751 (Fig. 7) in its normal illustrated position, a circuit is completed by way of its contacts 1 and contacts 741 for retaining the transfer A relay R830 in its operated position. Also, at its contacts 5, the assignment transfer key K751 connects the circuit of the transfer B relay R740 to the conductor C2122DAL extending to Fig. 3. The conductor C2122DAL is common to all of the directors in the exchange and will be grounded whenever the relay, corresponding to the relay R2190 in the call recorder 2000 portion of any director, is operated and closes the contacts corresponding to the contacts 2192. If the assignment transfer key K751 is actuated to close its contacts 2, 4 and 6, then the transfer B relay R840 instead of the transfer A relay R830 will be operated to connect all of the conductors in the cable C802 to the detector assigner 1910B instead of to the detector assigner 1910A. Also, the conductor C2122DAL that is common to all of the directors in the exchange, will then be connected to the winding of the transfer A relay R730 instead of to the transfer B relay R740.

At the present time, it will be assumed that the transfer control circuit 780 is in the condition shown in Fig. 7 with the assignment transfer key K751 in its normal position. Consequently, the detector assigner 1910A is now connected for operation and will control the assignment of the detector 1900 for use by any calling director. In the event that the detector 1900 is not associated with the calling director within a predetermined elapsed time interval, the relay corresponding to the relay R2190 in the call recorder 2000 portion of the director that is connected to the detector 1900 will be operated over a circuit including the conductor 443MS3 (from a timer not shown in the associated director), contacts 2018, 2066, 2163 and 2182 if the detector test relay R2180 is not operated, contacts 2194 and the winding of the relay R2190 to battery. The relay will immediately lock itself by way of its contacts 2193 to ground at the release key K475.

At the contacts 2195, the relay R2190 completes an obvious circuit for illuminating the alarm lamp L2118 in order to signal the exchange attendant that the detector 1900, for some reason or other, was not associated with the calling director within the allotted predetermined elapsed time interval.

As a further result of the operation of relay R2190, at its contacts 2192, it applies ground potential to the conductor C2122DAL extending to Fig. 7, then by way of the contacts 741', 731', contact 5 on the assigner transfer key K751, and the upper winding of the transfer B relay R740, to battery. The relay R740 now operates and locks itself by way of its lower winding and contacts 746 to ground potential at the reset key K782.

As soon as the transfer B relay R740 operates in the manner described above, it opens its contacts 741 and simultaneously closes its contacts 742. The former contacts interrupts the circuit for the transfer A relay R830 and the latter contacts complete the circuit for operating the transfer B relay R840. The transfer A relay R830 now restores to normal to disconnect, at its contacts 1 to 10 and 01 to 00, inclusive, the twenty marking conductors, C2026TM11 to C2026TM19, C2026TM10, C2026TM01 to C2026TM09 and C2026TM00 in the cable C802 from the detector assigner 1910A. At the contacts 831, the transfer A relay R830 removes the locking ground potential from the circuits of the connect relays R710, R810 and R910 in order to restore the latter relays. Also, at the contacts 832, the transfer A relay R830 now interrupts a point in the previously described circuit including the conductor 524KA extending to Fig. 5 in order to release the cut-in relay R570. The interruption in the latter circuit renders the control circuit group A portion of the detector 1900 ineffective and it will be disconnected response to the subsequent restoration of the connect relays R510A and R510B.

The operation of the transfer B relay R840 connects the twenty marking conductors C2026TM11 to C2026TM00 in the cable C802 by way of its contacts 1 to 10 and 01 to 00 to the detector assigner 1910B. Since the detector assigner 1910B is exactly the same as the detector assigner 1910A, it will be conditioned to operate in the same manner as the latter detector assigner. At the contacts 842, the relay R840 connects the conductor 525KA extending to Fig. 7 to the detector assigner 1910B so that the latter assigner will exercise control over the detector cut-in relay (corresponding to the relay R570) in the control circuit group B portion 761 of the detector 1900. The control circuit group B portion 761 of the detector 1900 is exactly the same as the control circuit group A portion of the detector illustrated in Figs. 5 and 6. Finally, the transfer B relay R840, at its contacts 841, applies ground potential to the conductor 841GG extending to the detector assigner 1910B, which forms the same control as the conductor 831GG connected to the contacts 831 on the transfer A relay R830. In other words, the grounding of the conductors 841GG at contacts 841 will operate the connect relays in the detector assigner 1910B corresponding to the connect relays R710, R810 and R910 provided in the detector assigner 1910A.

Referring again to the transfer B relay R740, it will be seen that at its contacts 744 and 745 it disconnects the winding of the start relay R755 from the circuit including the contacts 811 on the connect relay R810 to a circuit including the conductor C766SG extending to Fig. 9 and then ground at contacts (corresponding to the above mentioned contacts 811) provided in the detector assigner 1910B. At the contacts 748, the relay R740 disconnects the conductor 593LA from ground at contacts 759 and connects it to an incomplete circuit including the contacts 749. Also the conductor 593LB extending to the control circuit group B portion 761 of the detector 1900 is disconnected from the incomplete circuit including the contacts 749' and connected by way of the contacts 747 and 738, and contacts 1 on the K752 to ground at contacts 759. The removal of ground potential from the conductor 593LA extending to Fig. 5 interrupts a point in the circuit including the resistor 592 and the windings of the connect relays R510A and R510B in the control circuit group A portion of the detector 1900. These relays now restore to normal and at their various contacts will disconnect the control circuit group A portion of the detector 1900 from use and the grounding of the corresponding conductor 593LB operates connect relays corresponding to relays R510A and R510B provided in the control circuit group B portion 761 to render the last-mentioned control circuit effective in conjunction with the operation of the detector 1900.

Finally, at the contacts 743, the transfer B relay R740 connects the winding of the alarm relay R765 to the series circuit including the assigner A failure lamp L754. The lamp L754 will now be illuminated to indicate to the exchange attendant that the detector assigner 1910A has failed in its attempt to connect the detector 1900 to the calling director. Also, the alarm relay R765 will operate in series with the lamp L754 to complete a visual and an audible alarm signal, not shown, to notify the exchange attendant that a faulty condition has been encountered.

After the faulty condition has been corrected, either in the detector assigner 1910A or in the control circuit group A portion of the detector 1900, the exchange attendant may actuate the reset key K782 to interrupt the locking circuit for the transfer B relay R740. The relay R740 will now restore to normal and will again place the detector assigner 1910A and the control circuit group A portion of the detector back in service. The control circuit group B portion 761 of the detector 1910A and the detector assigner 1910B will be removed from service.

If the exchange attendant should actuate the assigner transfer key K751 before the reset key K782 is restored to normal, then the subsequent restoration of the reset key K782 while restoring the relay R740, but it will not cause the transfer to take place from the group B to the group A detector assigner. The alarm condition will, however, be removed because of the opening of the contacts 743. In other words, with the key K751 in its actuated position, the ground potential at the contacts 2 will complete the circuit by way of the contacts 732 for retaining operated the transfer B relay R840. Also, the start relay R755 will be connected to the circuit including the key contact 4, contacts 734 and the conductor 766SG extending to Fig. 9. Finally, at the key contacts 6, the lower winding of the transfer A relay R730 will be included in the circuit by way of the contacts 731′ and 741′ to the conductor C2122DAL extending to all of the directors. Since the detector assigner 1910B and the control circuit group B are now in use in conjunction with the detector 1900, any fault that should occur in the attempt to connect the detector 1900 to any calling director will now cause the operation of the transfer A relay R730. The relay R730 under this condition will now disconnect the control circuit group B portion 761 and connect the control circuit group A portion of the detector 1900. It will also disconnect the detector assigner 1910B and connect up the detector assigner 1910A.

One additional control provided in the transfer control circuit 780 involves the detector transfer key K752. With the key in an illustrated normal position, the ground potential at contacts 759 can be connected by way of contacts on the relays R730 and R740 to either the conductor 593LA or the conductor 593LB to control the respective control circuit group A or group B portions of the detector 1900. The exchange attendant may therefore control the detector transfer key K752 to selectively connect into service either the control group A portion of the detector 1900 or the control group B portion of the detector 1900 regardless of the operated and restored conditions of the transfer A and transfer B relays R730 and R740.

In the above description it was pointed out that the control circuit group A portion of the detector 1900 could be disconnected by restoring the connect relay R510A and R510B shown respectively in Figs. 5 and 6. At the contacts 101 on the relay R510A and the contacts 14 on the relay R510B the series circuit for the hold relay R590 will be interrupted. This relay is normally held in its operated position over the above series circuit so that the resistor 592 is normally included in the operating circuit to reduce the current flow through the windings of the relays R510A and R510B. However, when the circuit is opened at the contacts 101 and 14 by the restoration of relays R510A and R510B, the relay R590 also restores to normal to close its contacts 591 and short the resistor 592. With this arrangement, the subsequent application of ground potential to the conductor 593LA for the purpose of reconnecting the control circuit group A, the current flow through to the windings of relays R510A and R510B will be sufficient to operate the relays. The contacts 101 and 14 will again close to reenergize the hold relay R590 and the latter relay, at its contacts 591, will again include the resistor 592 in the holding circuit for the connect relays R510A and R510B.

*Double detection alarm*

In the previous description of the operation of the detector 1900, it was pointed out that the double detection marginal relay R530 is included in the circuit of a group marking relay, such as R420, in the particular hundreds access group of the detector 1900 that terminates the identifying conductor individual to the calling subscriber stations. The relay R530, however, does not operate in series with only one group marking relay, such as R420. It was also pointed out that if two or more group marking relays, such as R420, are multiply included in the circuit of the upper winding of the double detection relay R530, the latter relay does operate. This condition is indicative of a fault in the operation of the detector 1900 since it cannot simultaneously detect and register in an associated director the last five digits of the directory numbers of two or more subscriber stations.

In order to describe the double detection operation, it will be assumed that the relay R530 is operated and as a result thereof, locks itself by way of the contacts 532 and its lower winding to ground at contacts 572.

As a further result of the operation of relay R530, at its contacts 533, it completes the operating circuit for the disconnect relay R580. Also, at its contacts 535, it completes a circuit including the contacts 16 on the operated connect relay R510B for operating the common alarm relay R640. At its contacts 536, the relay R530 applies ground potential by way of the contacts 17 on the operated connect relay R510B to the conductor 1962MINC extending to Fig. 2, then by way of closed contacts on the operated director detector connect relay R1910, conductor 1962INC extending to Fig. 3, and the winding of the detector failure relay R2160 in the call recorder 2000 portion of the calling director. The relay R2160 will operate over this circuit and lock itself by way of its X contacts 2165 to ground at contacts 2011′. As a further result of the operation of the detection failure relay R2160, at its contacts 2161 and 2162, it interrupts points in the previously described circuits for connecting the calling director, under control of the detector assigner 1910A, to the detector 1900.

Referring again to the circuits controlled by the operation of the double detect relay R530, it will be seen that at its contacts 534 the relay removes ground potential from the conductor 1961MEB extending to Fig. 2 in order to prevent the completion of the circuit for operating the detection complete relay R2060 included in the call recorder 2000 portion of the calling director.

As soon as the disconnect relay R580 operates it interrupts its contact 582 in order to render effective the circuit including the winding of the detector cut-in relay R570 the contacts 573, the resistor 577, and the conductor 524KA extending to Fig. 8. Thus, the detector cut-in relay R570 will remain locked-up over the circuit including one of the units relays 901 and the detector test relay, such as R2180, in the call recorder 2000 portion of the director until the latter relay is removed from the circuit by the operation of the detector failure relay R2160. As a further result of the operation of the disconnect relay R580, at its contacts 581, it interrupts a point in the previously described circuit for the winding of the double detect relay R530. However, the latter relay, at its contacts 531, retains the holding ground potential on the circuit for its upper winding.

Referring now to Fig. 6, it will be recalled that the relay R640 operated under control of the contacts 535 on the double detect relay R530. The relay R640 locks itself by way of the contacts 641 to ground on the cut-off key K660. Also, at its contacts 642 and 643 the relay R640 transfers the positive 90 volt battery 665 from the circuit including the conductor 663GS extending to Fig. 4 to the conductor 662GP extending to Fig. 4. The positive 90 volts connected to the conductor 662GP is extended by way of multiple conductors (not shown) to the plate electrodes of all of the signal tubes, including the tube 470, in the detector 1900. The signal tube 470 individual to the hundreds access group including the detected calling station identifying conductor has been illuminated by the application of positive 90 volt potential to the conductor 663GS by way of resistor A, such as 472, to the start electrode of the tube. A corresponding signal tube, included in one or more of the other hundreds access groups in the detector that has been operated in response to the identification of a subscriber station, is also illuminated. The positive 90 volt battery 665 connected to the plate electrodes of signal tubes, such as 470, that have previously been illuminated by a start electrode potential will now remain in their illuminated conditions even though the start potential has now been disconnected from the conductor 663GS. However, all other signal tubes in the detector 1900 will now be prevented from operating inasmuch as the start potential is removed from the conductor 663GS. The illuminated conditions of the signal tubes, such as 470, in two or more of the hundreds access groups will identify each of the hundreds access groups in which a detection has occurred.

Referring again to the relay R640, it will be seen that, at its contacts 644, it completes a circuit for illuminating the signal lamp L647DDA; at its contacts 645, it illuminates the lamp L648; and, at its contacts 646, it completes a circuit for the audible alarm 649.

The operation of the detection failure relay R2160 controls the calling director in the manner described in the previously mentioned Coleman application to release the detector 1900; to remove any false registration of a calling subscriber station number from the calling line number register in the call recorder 2000 portion of the director; and it causes the director to automatically route the particular call to an intercept operator position.

The previously mentioned relay R640 remains locked in its operated position to the cut-off key K660 until the exchange attendant has corrected the fault that caused the double detection. The cut-off key K660 may be momentarily actuated by the exchange attendant when the fault is corrected to cause the restoration of the relay R640. The lamps L647 and L648 will be extinguished and the alarm 649 will be disconnected as soon as the relay R640 restores. Also, the contacts 643 on the relay R640 will disconnect the positive 90 volt battery potential 665 from the conductor 662GP thereby to extinguish any of the illuminated signal tubes, such as 470, that have marked the hundreds access groups involved in the double detection. The detector 1900 will now restore in the manner previously described and rendered available for use in connection with the detection of the directory numbers of other calling subscriber stations.

*Detector timer relays*

In the previous description of the normal operation of the detector 1900, it was pointed out that the timer relays R560, R550 and R540 start to release in sequence as soon as the detector 1900 is seized for a detection operation. However, normally the elapsed time required to complete a detection and operate the detection complete relay R520 is less than the release time of the timer relays. Thus, the detector timer relays R560, R550 and R540 will be reoperated before they are fully restored to normal. However, if the detection cycle is delayed for any reason, the above named relays will all restore to normal. The last relay R540, at its contacts 541, will complete the previously described circuit for operating the disconnect relay R550 and, at the contacts 542, will complete the circuit including the conductor 1962MINC extending to Fig. 2 in order to operate the detection failure relay R2160. The operations controlled by the detection failure relay R2160 have been described above. The operation thereof under control of the timer relay R540 performs the same controls to disconnect the detector 1900 from the calling director and to control the director to route the call to an intercept operator position.

*Detection of a calling subscriber on an individual line*

In the previous description of the operation of the system, it was pointed out that individual stations on individual lines may be distributed throughout all of the hundreds groups of connector terminals serving subscriber stations on party lines. The ringers at such individual stations, however, must be arranged so that they will respond to the ringing frequency of the connector group in which the lines terminate. These individual lines, however, form a sixth group or class of lines as far as the detector 1900 is concerned since it is necessary for the detector in its detection cycle to find the identifying conductor individual to the calling individual station and to determine whether it terminates in the hundreds access group serving the second, third, fourth and fifth stations on party lines.

Consequently, when any individual station on an individual line initiates a call, the director is controlled so that the class 2 test relay R580 (Fig. 2) in the calling director is operated whereas all of the party stations relays R1870P1 to R1870P5, inclusive, in the coder 1800 portion of the calling director will remain in their restored positions. When the director is associated with the detector by means of the detector assigner 1910A, the ground potential applied to the conductor 513PM (Fig. 2) will be extended by way of the contacts 581, conductor 516P0, contacts on the director detector connect relay R1910, conductor 516MP0 extending to Fig. 6 in order to operate the individual line relay R610 in the control circuit group A portion of the detector 1900. This relay, at its contacts 611 to 616, inclusive, will connect the ground potential through the upper winding of the double detection relay R530 to each of the conductors 650PC0 to 655PC5, inclusive, to condition the group marking relays, such as R420, in each of the hundred access groups terminating identifying conductors of both party and individual lines for operation. However, when the positive 90 volt battery is applied to the conductor 272LS by the operation of the detector signal relay, such as R2170, in the call recorder 2000 portion of the calling director, the potential will only be applied to the identifying conductor corresponding to the conductor C1100, that is individual to only the calling subscriber station on the individual line. Therefore, only the gas-filled discharge tubes, corresponding to the tube G1100, individual to the calling station will be rendered conductive to cause the operation of the associated group relay, corresponding to the relay R410. The latter relay in turn will complete the circuit for operating the group marking relay, such as R420, that is individual to the group of 100 lines containing the identifying conductor of the calling individual station.

The remaining group marking relays associated with all other hundreds access groups cannot be operated at this time because the gas filled tubes included in such groups will not have the breakdown potential of positive 90 volts applied to an associated identifying conductor. Thus, any individual line in the exchange may be terminated in any party line connector bank terminal and it may be identified by the detector in substantially the same manner as any party subscriber station is identified on a calling party line.

With regard to P. A. B. X stations and P. B. X stations it should be noted that they terminate in separate connector groups, as is illustrated by the subscriber station TX3 (Fig. 3). The identifying conductor C1600, for example, is individual to the subscriber station TX3 which, for example, may be representative of any P. A. B. X or P. B. X station. When a call is initiated on such a station, all of the party station relays in the coder 1800 portion of the associated calling director will remain in their restored positions and the ground potential applied to the conductor 513PM will be extended by way of the conductor 1896POX and a contact on the director detector connect relay R1910 to the conductor 1896MPOX extending to Fig. 6 in order to operate the P. A. B. X or P. B. X marking relay R620. This relay, at its contacts 621 will apply the marking potential to the conductor 650PC0 extending to Fig. 4 thereby to condition the group marking relay corresponding to the relay R420 provided in the 1600 access group 406 of identifying conductors terminating in gas filled tubes (not shown), such as G1100. The operation of the 1600 group is exactly the same as has been previously described in connection with the operation of the 1100 access group in the detector 1900 and it should be apparent from the previous description of operation that the directory number of the calling station, either P. A. B. X or P. B. X, will be registered in the calling line number register of the call recorder 2000 portion of the calling director.

While one embodiment of the invention has been disclosed, it will be understood that various modifications may be made therein which are within the true spirit and scope of the invention.

What is claimed is:

1. A line identification circuit for a telephone system having a group of subscriber lines and having a different multi-digit designation for each line in said group, comprising a single gas-filled electronic device individual to each of said lines, each of said devices having only two electrodes, one of said electrodes of each of said devices connected to a corresponding one of said lines, means controlled over any one of said lines responsive to a call initiated thereover for rendering only the associated one of said gas-filled devices conducting between its electrodes, a first control means connected to the other of said electrodes of all of said devices operated responsive to the conductivity of any one of said devices, a plural digit register, a second control means operated responsive to the operation of said first control means for operating said register to register therein a portion of the multi-digit designation of said one calling line, a group of third control devices including at least one device for each of said lines in said group of lines, connecting means operated in response to the operation of said second control means for connecting said group of third control devices respectively to the one electrode of each of said gas-filled electronic devices connected to said lines in order to operate the particular third control device corresponding to the particular calling one of said lines, means controlled in response to the operation of said third control device for operating said register to register the remaining portion of the multi-digit designation of said calling line, a signal device common to the group of said gas-filled devices corresponding to said group of subscriber lines, means controlled responsive to the initiation of said call on said one line for preparing said signal device for operation, and additional means controlled by said connecting means for illuminating said signal device to indicate the group of gas-filled devices including the conducting gas-filled device individual to said line.

2. A line identification circuit for a telephone system having a group of subscriber lines and having a different multi-digit designation for each line in said group, comprising a single gas-filled electronic device individual to each of said lines in said group, each of said devices having only two electrodes, one of said electrodes of each of said devices connected to a corresponding one of said lines, a first source of potential, a second source of potential, means controlled over any one of said lines responsive to a call initiated thereover for connecting said first source of potential to said one electrode of the device corresponding to said calling line in order to render said one device conductive between its electrodes, a first relay connected to the other electrodes of all of said gas-filled devices in said group operated responsive to the conductivity of any of said devices, a register, register control means, additional means controlled over said calling line responsive to a call thereon for selectively preparing a point in a circuit including said second source of potential and a contact on said first relay, means including said contact controlled by said operation of said first relay for connecting said second source of potential to operate said register control means, and means controlled responsive to the operation of said register control means for operating said register to register the designation of said calling line.

3. A line identification circuit for a telephone system having a group of subscriber lines and having a different multi-digit designation for each line in said group, comprising a single gas-filled electronic device individual to each of said lines in said group, each of said devices having only two electrodes, one of said electrodes of each of said devices connected to a corresponding one of said lines, a relay connected to the other one of the electrodes of each of said devices, a first source of potential, a second source of potential, means controlled over any one of said lines responsive to a call initiated thereover for connecting said first source of potential to said one calling line to complete a circuit for rendering said device corresponding to said one calling line conductive between its two electrodes and for operating said relay, marking control means, means controlled responsive to the operation of said relay for connecting said second source of potential to said marking control means to operate the same, a register, means controlled by said operation of said marking control means for registering in said register the multi-digit designation of said calling line, a signal tube common to the group of said gas-filled devices corresponding to said group of subscriber lines, a start electrode for said signal tube, and means controlled by said marking control means for applying a starting potential to said start electrode to illuminate said signal tube to thereby indicate the group of gas-filled devices including said conducting device individual to said calling line.

4. A line identification circuit for a telephone system having a subscriber line identified by a multi-digit designation, comprising a single gas-filled electronic device individual to said line, said device having only two electrodes, one of said electrodes connected to said line, means controlled over said line responsive to a call initiated thereover for rendering said gas-filled device directly conducting between said electrodes, a plural digit register, first control means associated with the other of said electrodes and operated responsive to the conductivity of said device, second control means operated by said first control means to selectively operate said register to register therein a portion of the digits in said multi-digit designation of said calling line, third control means selectively controlled by said second control means for operating said register to register the remaining portion of the digits of said multi-digit designation of said calling line, a signal device common to a predetermined plurality of said gas-filled devices, and means controlled by said third control means for illuminating said signal device to visually identify the plural group of gas-filled devices containing the conducting device individual to said line.

5. In a telephone system including a group of lines, each of said lines having a multi-digit number individual thereto, a single identifying conductor individual to each of said lines, a single gas-filled two element discharge device individual to each of said identifying conductors, means responsive to a call on any one of said lines for impressing an identifying potential on said identifying conductor individual thereto for rendering the associated device conducting between its two elements, a first group of marking conductors, a group relay connected to one of the elements to all of said devices and operated responsive to the conductivity between the two elements of any one of said devices, apparatus controlled from said calling line for registering the class of service of said calling line, a marking control relay, means controlled by said calling line class of service, means for preparing a point in a circuit for said marking control relay, means controlled by said operation of said group relay for completing said prepared circuit to operate said marking control relay, means controlled by the operation of said marking control relay for marking said first group of marking conductors in accordance with certain of the digits of the multi-digit identifying number of said calling line, a second group of marking conductors, a second marking control means individual to each of said lines, connecting means controlled in response to the operation of said first marking control relay for connecting each one of said second marking control means to the identifying conductors individual to each of the lines in said group of lines to operate only the one of said second marking control means corresponding to said one identifying conductor having said identifying potential applied thereto, a cold cathode tube individual to said group of discharge devices, and means governed by said connecting means for illuminating said cold cathode tube to indicate the group of gas-filled discharge devices including the conductive device individual to said calling line.

6. In a telephone system, a party line, a plurality of stations on said party line, a plurality of terminals individual to the various stations on said party line having different individual multi-digit designations, apparatus controllable from any calling one of said stations for extending a connection from said party line and for registering the position of the particular calling station on said party line; a detector, an identifying conductor individual to each of the stations on said party line interconnecting said detector and the terminal individual to the corresponding station on said party line, access groups in said detector corresponding respectively to each of said stations, each of said access groups including a plurality of gas-filled discharge devices, each of said devices having only first and second electrodes individual to each station identifying conductor in the corresponding group, the first electrode of each of said devices in each of said groups connected to said identifying conductor individual to the corresponding stations on said party line, means controlled responsive to a call on said party line for applying an identifying potential to the identifying conductors individual to each of said stations on said party line, a relay in each of said access groups, said gas-filled discharge devices individual to each of the stations in each of said access groups rendered conductive in response to the potential applied to said identifying conductors in order to operate said relay in each of said access groups, a marking control relay in each of said access groups, means controlled by the operation of each of said relays for attempting to complete a circuit for operating said marking control relay in each of said access groups, means controlled in response to said registration of the position of said calling station on said party line for completing the operating circuit for only the marking control relay in the particular access group corresponding to the position of said calling station on said party line, a designation register, and means controlled by said operating marking control relay for registering the multi-digit designation of only said calling station in said designation register.

7. The system set forth in claim 6, wherein each of said groups of discharge devices corresponding to the different station positions on said calling party line includes a separate signal tube, and means controlled responsive to the conductivity of a discharge device and the operation of said marking control relay in a corresponding group for illuminating said signal tube in the associated group.

8. The system set forth in claim 7, wherein the conductivity of two discharge tubes and the operation of two marking control relays in two or more groups will illuminate the signal tube in each of the corresponding groups to indicate the two or more groups that have operated control relays therein.

9. The system set forth in claim 8, including means for releasing said control relays in said two or more groups while still retaining said signal tubes illuminated to indicate the two or more groups in which the control relays have been operated.

10. The system set forth in claim 6, including a plurality of lines each having individual stations thereon, an identifying conductor individual to each line of said individual stations terminating in a gas-filled discharge device in different ones of said access groups, wherein the application of said identifying potential to the identifying conductor of a calling individual station renders the gas-filled device individual thereto in only the particular access group to become conductive to operate the associated access group first relay, an individual station relay operated responsive to said call initiated from said calling individual station in order to prepare circuits for operating said marking control relays in all of said access groups, wherein the circuit is completed for operating only the marking control relay in the particular access group in which said first relay is operated and means controlled by operation of said marking control relay for registering the multi-digit registration of only said calling individual station in said designation register.

11. In a telephone system, a plurality of party lines, a number of stations on each of said party lines, each of said party lines having a number of terminals individually corresponding to the stations thereon and having different individual multi-digit designations identifying the respective stations, corresponding ones of said terminals of said party lines being arranged in groups corresponding to the position of the stations on each party line, whereby the various terminals in a given group correspond to similarly positioned stations on said party line, a detector, an identifying conductor individual to each of said stations terminating in said detector, a gas-filled discharge device having only a first and a second electrode individual to each of said stations, said first electrode of each of said devices connected to the identifying conductor individual to the corresponding station terminal, a group relay commonly connected to all of the second electrodes of the discharge devices individual to identifying conductors of similarly positioned stations on said party lines, a station register, means responsive to the extension of a call from a given station on a given party line for operating said station register to register the position of said station on said line, an identifying signal, means also responsive to the extension of said call for applying an identifying signal to all of the identifying conductors individual to the various stations on said calling party line, the discharge device individual to each of said identifying conductors in each of said groups rendered conductive between the first and second electrodes thereof in order to operate the corresponding group relay in each one of the corresponding groups of discharge devices, a mark relay individual to each one of said groups, means controlled by said group relays for attempting to complete a circuit to said marking control relay in the associated group, means jointly controlled by said station register and one of said operated group relays for operating the marking control relay in the particular group terminating the identifying conductor individual to the particular calling station on said party line, and means controlled by said marking control relay for registering the multi-digit designation individual to said one calling station on said party line.

12. In a telephone system, an exchange having a group of lines extending thereto, switching apparatus, a plurality of register senders, each one of said register senders identified by an individual plural digit designation, means for associating an idle one of said register senders with a calling one of said lines and for operating said one register sender in accordance with a called line number, means in said one register sender for controlling said switching apparatus to set up a connection in accordance with said called number, an identifier including a single identifying conductor connected to each of said lines in said group, a single gas-filled discharge device connected to each of said conductors, a common group relay connected to all of said devices, an assigner operative to selectively connect a calling register sender that has been connected to said calling line to said identifier, means in said assigner selectively operated in accordance with the particular plural digits designation individual to said one calling register sender for selectively connecting said one register sender to said identifier and for applying a potential to said calling line identifying conductor in order to operate only the gas-filled discharge device individual thereto and said common group relay, a common identifying relay, means controlled in response to the operation of said common group relay for operating said common identifying relay, individual identifying relays for each of said identifying conductors, means controlled in response to the operation of said common identifying relay for connecting said individual identifying relays to corresponding ones of said identifying conductors in order to operate only the one of said individual identifying relays connected to said calling line identifying conductor, and means controlled by said first common identifying relay and said one individual identifying relay for registering the identity of said calling line in said calling register sender.

13. The telephone system set forth in claim 12, wherein said assigner includes group and units relays respectively operated in accordance with the particular digits in the designation of the particular calling register sender in order to connect the correspondingly designated register sender to said identifier.

14. The telephone system set forth in claim 12, wherein said assigner includes a first group of relays, one of which is selectively operated in accordance with certain of the digits of the designation of said calling register sender, a second group of relays, means controlled by the operated first group relay in said assigner for connecting said relays in said second group to a group of register senders including said calling register sender, means controlled by said calling register sender for operating a relay in said second group in accordance with certain other of the digits of the designation of said calling register sender, and means controlled by said operated first and second group relays in said assigner for connecting said calling register sender to said identifier.

15. The telephone system set forth in claim 14, wherein said operated relays in said first and second groups in said assigner are restored to normal in order to disconnect said calling register sender from said identifier in response to the registration of the identity of said calling line in said calling register sender.

16. The telephone system set forth in claim 14, wherein the operated first group relay in said assigner prevents any other first group relay from being operated by any other calling register sender in order to lock-out all other register senders from connection to said identifier.

17. The telephone system set forth in claim 16, wherein the operated first group relay connects all of said second group relays respectively to all register senders in the same group as said calling register sender, and wherein the operated second group relay corresponding to the calling one of said register senders in said one group in order to lock-out all other register senders in said one group from connection to said identifier.

18. The telephone system set forth in claim 14, wherein two or more first group relays in said assigner are operated by the simultaneous calling of a corresponding number of register senders in corresponding groups identified by said group relays to lock-in said group including said calling register senders, wherein said assigner controls said group relays to connect said register senders in corresponding locked-in groups to said second group relays one group at a time, and wherein said second group relays are operated one at a time to connect the calling ones of said register senders in each of said locked-in groups one at a time to said identifier.

19. In a telephone system, a plurality of register senders, each of said senders identified by an individual code designation comprising a plurality of digits, a group of subscriber lines, each of said lines identified by a directory number, switching apparatus, means for associating an idle one of said register senders with a calling one of said lines and for operating said one register sender in accordance with a called line number, an identifier common to said plurality of register senders, an assigner common to said register senders having a first group of relays and a second group of relays, means in said one register sender for operating a selected one of said relays in said first group and a selected one of said relays in said second group in accordance with the individual digits of said individual code designation of said one register sender, means individual to said one register sender for connecting said one register sender to said identifier, and means in said identifier controlled jointly by said one register sender and said identifier for registering the digits of the directory number of said calling line in said one register sender.

20. The system set forth in claim 19, wherein said register senders are identified by three digit code designations, and wherein said relays in said first group of relays in said assigner are selectively operated in accordance with the first and second digits of the code designation of said one register sender and said relays in said second group of relays in said assigner are selectively operated in accordance with the third digit of the code designation of said one register sender.

21. The system set forth in claim 19, wherein said register senders are identified by different three digit code designations, said relays in said first group of relays in said assigner are divided into subgroups and the different subgroups are selected in accordance with the first digit in the three digit register sender code designation and a particular relay in the selected subgroup is selected in accordance with the second digit of said three digit register sender code designation to connect said relays of said second group to all of the register senders having the same first and second digits in the code designation in order to operate the particular relay in said second group of relays in accordance with the third digit in the register sender code designation, whereby the particular operated subgroup relay in the selected subgroup of first group relays and the particular operated relay in said second group of relays control the connection of the register sender having the corresponding three digit code to said identifier.

22. In a telephone system, a group of subscriber lines having stations thereon identified by different multidigit directory numbers, switching apparatus, a plurality of register senders, said register senders identified by different individual plural digit designations, means for associating an idle one of said register senders with a calling one of said lines and for operating said one register sender in accordance with a called line number, means in said one register sender for controlling said switching apparatus to set up a connection in accordance with said called number, a common identifier operative to identify the directory number of a calling station on any calling line, first and second assigners, said first assigner normally operative to selectively connect a calling register sender to said common identifier, means in said first assigner selectively operated in accordance with said particular plural digits of said designation individual to said one calling register sender for selectively connecting said one register sender to said identifier and for operating said identifier to identify the directory number of said calling station, means controlled by said identifier for normally controlling said first assigner to disconnect said identifier from said calling register sender as soon as said calling station directory number is identified, timer means in said calling register sender operative a predetermined period after the operation of said first assigner in connecting said calling register sender to said identifier, and further means responsive to the operation of said timer means for rendering said first assigner inoperative and for rendering said second assigner operative, whereby upon failure of a station to be identified in said register sender within said predetermined period said second assigner is rendered operative for connecting said calling register sender to said identifier.

23. The system set forth in claim 22, wherein said identifier includes a first control unit normally connected to said identifier for operation in connection with the identification operation of said identifier and a second stand-by control unit normally disconnected from said identifier, and wherein said further means in response to the operation of said timer means disconnects said first control unit from said identifier and connects said second control unit to said identifier for operation in connection with the identification operation of said identifier.

24. In a telephone system, a group of subscriber lines having stations thereon identified by multi-digit directory numbers, switching apparatus, a plurality of register senders, said register senders identified by different individual plural digit designations, means for associating an idle one of said register senders with a calling one of said lines and for operating said one register sender in accordance with a called line number, means in said one register sender for controlling said switching apparatus to set up a connection in accordance with said called number, an identifier for identifying the directory number of the station on any calling line, a first control unit and a second control unit selectively connectable to said identifier for controlling the operation thereof in the identification operation, a first assigner and a second assigner selectively operative for connecting a calling one of said register senders to said identifier, and control means normally connecting said first control unit to said identifier and normally rendering said first assigner operative and operable for disconnecting said first control unit from and for connecting second control unit to said identifier and for rendering said first assigner inoperative and for rendering said second assigner operative; each of said assigners including means responsive to the operation thereof by said control means for receiving therein the plural digits designating a calling one of said register senders, means responsive to the receipt therein of plural digits identifying said one register sender; for connecting said register sender to said identifier and for operating said identifier to identify the directory number of the calling station, and means responsive to the identification of the calling station in the register sender for disconnecting said identifier from said one register sender; timer means in said calling register sender operative a predetermined period after the operation of said first assigner in connecting said register sender to said identifier, and further means included in said control means responsive to the operation of said timer means for operating said control means to disconnect said first control unit from said identifier and to connect said second control unit to said identifier and to render said first assigner inoperative and to render said second assigner operative, whereby upon failure of a station to be identified in said register sender within said predetermined period said second assigner is rendered operative for connecting said calling register sender to said identifier.

References Cited in the file of this patent

UNITED STATES PATENTS 2,672,518 Holden ---------------- Mar. 16, 1954